(12) United States Patent
Walker et al.

(10) Patent No.: US 9,171,316 B2
(45) Date of Patent: Oct. 27, 2015

(54) METHOD AND APPARATUS FOR VENDING A COMBINATION OF PRODUCTS

(75) Inventors: Jay S. Walker, Ridgefield, CT (US); Daniel E. Tedesco, Huntington, CT (US); James A. Jorasch, Stamford, CT (US); Robert R. Lech, Dublin, OH (US); Dean P. Alderucci, Stamford, CT (US)

(73) Assignee: Inventor Holdings, LLC, Stamford, CT (US)

( * ) Notice: Subject to any disclaimer, the term of this patent is extended or adjusted under 35 U.S.C. 154(b) by 1840 days.

(21) Appl. No.: 11/761,826

(22) Filed: Jun. 12, 2007

(65) Prior Publication Data

US 2007/0228062 A1  Oct. 4, 2007

Related U.S. Application Data

(63) Continuation of application No. 10/095,372, filed on Mar. 11, 2002, now Pat. No. 7,233,912, which is a continuation-in-part of application No. 09/012,163, filed on Jan. 22, 1998, now Pat. No. 6,397,193, which is a continuation-in-part of application No. 08/947,798, filed on Oct. 9, 1997, now Pat. No. 7,546,277, and a continuation-in-part of application No. 08/920,116, filed on Aug. 26, 1997, now Pat. No. 6,119,099.

(51) Int. Cl.
*G06Q 30/00* (2012.01)
*G06Q 30/02* (2012.01)
(Continued)

(52) U.S. Cl.
CPC .......... *G06Q 30/0237* (2013.01); *G06Q 10/087* (2013.01); *G06Q 20/00* (2013.01); *G06Q 20/12* (2013.01); *G06Q 20/20* (2013.01); *G06Q 20/201* (2013.01); *G06Q 20/203* (2013.01); *G06Q 20/387* (2013.01); *G06Q 30/02* (2013.01); *G06Q 30/0238* (2013.01); *G06Q 30/06* (2013.01); *G07C 15/005* (2013.01); *G07F 5/18* (2013.01); *G07F 5/24* (2013.01); *G07F 9/026* (2013.01); *G07F 11/002* (2013.01); *G07F 17/32* (2013.01); *G07F 17/3248* (2013.01); *G07F 17/3255* (2013.01); *G07G 1/0036* (2013.01); *G07G 1/12* (2013.01); *G07G 5/00* (2013.01)

(58) Field of Classification Search
USPC ..................................................... 705/50–79
See application file for complete search history.

(56) References Cited

U.S. PATENT DOCUMENTS

| 2,607,463 A | 8/1952 | Saigh |
| 3,442,422 A | 5/1969 | Neidig |

(Continued)

FOREIGN PATENT DOCUMENTS

| CA | 2070736 A1 | 6/1992 |
| CA | 2217739 | 4/1996 |

(Continued)

OTHER PUBLICATIONS

Office Action for U.S. Appl. No. 11/456,342 dated Sep. 14, 2007, 6pp.

(Continued)

*Primary Examiner* — Steven Kim
*Assistant Examiner* — Tim Hale
(74) *Attorney, Agent, or Firm* — Fincham Downs, LLC; Carson C. K. Fincham

(57) ABSTRACT

A method and apparatus for delivering a plurality of products from a vending machine is disclosed. The method generally allows an offer for a package to be output, in which the package defines a plurality of products, including a selected product. An apparatus is also disclosed to carry out the method steps of the present invention.

12 Claims, 16 Drawing Sheets

(51) Int. Cl.

| | | |
|---|---|---|
| *G06Q 10/08* | (2012.01) | |
| *G06Q 20/00* | (2012.01) | |
| *G06Q 20/12* | (2012.01) | |
| *G06Q 20/20* | (2012.01) | |
| *G06Q 20/38* | (2012.01) | |
| *G06Q 30/06* | (2012.01) | |
| *G07C 15/00* | (2006.01) | |
| *G07F 5/18* | (2006.01) | |
| *G07F 5/24* | (2006.01) | |
| *G07F 9/02* | (2006.01) | |
| *G07F 11/00* | (2006.01) | |
| *G07F 17/32* | (2006.01) | |
| *G07G 1/00* | (2006.01) | |
| *G07G 1/12* | (2006.01) | |
| *G07G 5/00* | (2006.01) | |

(56) References Cited

U.S. PATENT DOCUMENTS

| | | |
|---|---|---|
| 3,573,747 A | 4/1971 | Adams |
| 3,691,527 A | 9/1972 | Yamamoto |
| 3,705,384 A | 12/1972 | Wahlberg |
| 3,747,733 A | 7/1973 | Knickerbocker |
| 3,784,027 A * | 1/1974 | Gold .................... 211/184 |
| 3,806,166 A * | 4/1974 | Spear .................... 283/55 |
| 3,937,929 A | 2/1976 | Knauer |
| 3,947,882 A | 3/1976 | Lighter |
| 4,008,792 A | 2/1977 | Levasseur |
| RE29,450 E | 10/1977 | Goldsby |
| 4,108,361 A | 8/1978 | Krause |
| 4,157,829 A | 6/1979 | Goldman |
| 4,225,056 A * | 9/1980 | Flubacker .................... 221/2 |
| 4,237,537 A | 12/1980 | Pitches |
| 4,245,730 A | 1/1981 | Bachmann |
| 4,258,837 A | 3/1981 | Manos |
| 4,282,575 A | 8/1981 | Hoskinson |
| 4,316,532 A | 2/1982 | Levasseur |
| 4,323,770 A | 4/1982 | Dieulot |
| 4,341,951 A | 7/1982 | Benton |
| 4,359,147 A | 11/1982 | Levasseur |
| 4,376,479 A | 3/1983 | Sugimoto |
| 4,412,292 A | 10/1983 | Sedam |
| 4,417,671 A * | 11/1983 | Kawasaki et al. .................... 222/56 |
| 4,420,751 A | 12/1983 | Paganini |
| 4,441,160 A | 4/1984 | Azcua |
| 4,478,353 A | 10/1984 | Levasseur |
| 4,494,197 A | 1/1985 | Troy |
| 4,498,570 A | 2/1985 | King |
| 4,500,880 A | 2/1985 | Gomersall |
| 4,518,098 A | 5/1985 | Fleischer |
| 4,551,935 A | 11/1985 | Bachmann |
| 4,554,446 A | 11/1985 | Murphy |
| 4,567,609 A | 1/1986 | Metcalf |
| 4,574,947 A | 3/1986 | Hutchings |
| RE32,115 E | 4/1986 | Lockwood |
| 4,593,361 A | 6/1986 | Otten |
| 4,598,378 A | 7/1986 | Giacomo |
| 4,598,810 A | 7/1986 | Shore |
| 4,603,390 A | 7/1986 | Mehdipour |
| 4,628,193 A | 12/1986 | Blum |
| 4,636,963 A | 1/1987 | Nakajima et al. |
| 4,639,875 A | 1/1987 | Abraham |
| 4,654,513 A | 3/1987 | Hennessy |
| 4,654,800 A | 3/1987 | Hayashi |
| 4,668,150 A | 5/1987 | Blumberg |
| 4,669,730 A | 6/1987 | Small |
| 4,677,553 A | 6/1987 | Roberts |
| 4,679,150 A | 7/1987 | Hayashi |
| 4,689,742 A | 8/1987 | Troy |
| 4,723,212 A | 2/1988 | Mindrum |
| 4,734,858 A | 3/1988 | Schlafly |
| 4,736,096 A | 4/1988 | Ushikubo |
| 4,737,910 A | 4/1988 | Kimbrow |
| 4,743,022 A | 5/1988 | Wood |
| 4,760,247 A | 7/1988 | Keane |
| 4,766,548 A | 8/1988 | Cedrone |
| 4,799,156 A | 1/1989 | Shavit |
| 4,815,741 A | 3/1989 | Small |
| 4,817,166 A | 3/1989 | Gonzalez |
| 4,817,990 A | 4/1989 | Krost |
| 4,825,045 A | 4/1989 | Humble |
| 4,833,308 A | 5/1989 | Humble |
| 4,833,607 A | 5/1989 | Dethloff |
| 4,834,231 A | 5/1989 | Awane |
| 4,839,507 A | 6/1989 | May |
| 4,854,590 A | 8/1989 | Jolliff |
| 4,857,840 A | 8/1989 | Lanchais |
| 4,859,838 A | 8/1989 | Okiharu |
| 4,872,113 A | 10/1989 | Dinerstein |
| 4,876,592 A | 10/1989 | Von Kohorn |
| 4,878,248 A | 10/1989 | Shyu |
| 4,882,473 A | 11/1989 | Bergeron |
| 4,882,675 A | 11/1989 | Nichtberger |
| 4,882,688 A * | 11/1989 | Kondziolka et al. ......... 358/1.18 |
| 4,899,906 A | 2/1990 | Bella |
| 4,902,880 A | 2/1990 | Garczynski |
| 4,906,828 A | 3/1990 | Halpern |
| 4,908,761 A | 3/1990 | Tai |
| 4,910,672 A | 3/1990 | Off |
| 4,915,205 A | 4/1990 | Reid |
| 4,922,435 A | 5/1990 | Cahlander |
| 4,922,522 A | 5/1990 | Scanlon |
| 4,937,853 A | 6/1990 | Brule |
| 4,947,028 A | 8/1990 | Gorog |
| 4,963,723 A | 10/1990 | Masada |
| 4,973,952 A | 11/1990 | Malec |
| 4,982,337 A | 1/1991 | Burr |
| 4,982,346 A | 1/1991 | Girouard |
| 4,992,940 A | 2/1991 | Dworkin |
| 4,993,714 A | 2/1991 | Golightly |
| 4,999,763 A | 3/1991 | Ousborne |
| 5,010,485 A | 4/1991 | Bigari |
| 5,025,372 A | 6/1991 | Burton |
| 5,029,098 A | 7/1991 | Levasseur |
| 5,034,739 A | 7/1991 | Gruhl |
| 5,036,472 A | 7/1991 | Buckley et al. |
| 5,039,848 A | 8/1991 | Stoken |
| 5,056,019 A | 10/1991 | Schultz |
| 5,058,044 A | 10/1991 | Stewart |
| 5,064,999 A | 11/1991 | Okamoto |
| 5,081,685 A | 1/1992 | Jones, III |
| 5,091,713 A | 2/1992 | Horne |
| 5,112,050 A | 5/1992 | Koza et al. |
| 5,117,354 A | 5/1992 | Long |
| 5,117,407 A | 5/1992 | Vogel |
| 5,119,295 A | 6/1992 | Kapur |
| 5,128,861 A | 7/1992 | Kagami |
| 5,128,862 A | 7/1992 | Mueller |
| 5,132,914 A | 7/1992 | Cahlander |
| 5,136,658 A | 8/1992 | Mori |
| 5,158,293 A | 10/1992 | Mullins |
| 5,172,328 A | 12/1992 | Cahlander |
| 5,173,851 A | 12/1992 | Off |
| 5,176,224 A | 1/1993 | Spector |
| 5,177,342 A | 1/1993 | Adams |
| 5,185,695 A | 2/1993 | Pruchnicki |
| 5,186,463 A | 2/1993 | Marin |
| 5,189,607 A | 2/1993 | Shirasaki |
| 5,191,410 A | 3/1993 | McCalley |
| 5,192,854 A | 3/1993 | Counts |
| 5,193,648 A | 3/1993 | Yuter |
| 5,200,889 A | 4/1993 | Mori |
| 5,201,010 A | 4/1993 | Deaton |
| 5,202,826 A | 4/1993 | McCarthy |
| 5,204,675 A | 4/1993 | Sekine |
| 5,216,595 A | 6/1993 | Protheroe |
| 5,223,698 A | 6/1993 | Kapur |
| 5,231,569 A | 7/1993 | Myatt |
| 5,239,165 A | 8/1993 | Novak |
| 5,243,515 A | 9/1993 | Lee |
| 5,243,652 A | 9/1993 | Teare |
| 5,245,533 A | 9/1993 | Marshall |

(56) References Cited

U.S. PATENT DOCUMENTS

| | | |
|---|---|---|
| 5,250,789 A | 10/1993 | Johnsen |
| 5,253,165 A | 10/1993 | Leiseca |
| 5,256,863 A | 10/1993 | Fergusen |
| 5,257,179 A | 10/1993 | DeMar |
| 5,262,941 A | 11/1993 | Saladin |
| 5,267,452 A | 12/1993 | Zinsmeyer |
| 5,269,521 A | 12/1993 | Rossides |
| 5,274,547 A | 12/1993 | Zoffel |
| 5,276,312 A | 1/1994 | McCarthy |
| 5,283,731 A | 2/1994 | Lalonde |
| 5,287,267 A | 2/1994 | Jayaraman |
| 5,287,268 A | 2/1994 | McCarthy |
| 5,295,064 A | 3/1994 | Malec |
| 5,297,026 A | 3/1994 | Hoffman |
| 5,297,031 A | 3/1994 | Gutterman |
| 5,302,811 A | 4/1994 | Fukatsu |
| 5,305,195 A | 4/1994 | Murphy |
| 5,309,355 A | 5/1994 | Lockwood |
| 5,315,093 A | 5/1994 | Stewart |
| 5,315,664 A | 5/1994 | Kumagai |
| 5,319,542 A | 6/1994 | King, Jr. |
| 5,325,291 A | 6/1994 | Garrett |
| 5,339,250 A | 8/1994 | Durbin |
| 5,345,071 A | 9/1994 | Dumont |
| 5,353,218 A | 10/1994 | De Lapa |
| 5,353,219 A | 10/1994 | Mueller |
| 5,361,871 A | 11/1994 | Gupta |
| 5,367,452 A | 11/1994 | Gallery |
| 5,368,129 A | 11/1994 | Von Kohorn |
| 5,371,796 A | 12/1994 | Avarne |
| 5,380,991 A | 1/1995 | Valencia |
| 5,381,155 A | 1/1995 | Gerber |
| 5,383,111 A | 1/1995 | Homma |
| 5,398,932 A | 3/1995 | Eberhardt |
| RE34,915 E | 4/1995 | Nichtberger |
| 5,408,417 A | 4/1995 | Wilder |
| 5,415,264 A | 5/1995 | Menoud |
| 5,417,424 A | 5/1995 | Snowden |
| 5,420,606 A | 5/1995 | Begum |
| 5,422,473 A | 6/1995 | Kamata |
| 5,425,108 A | 6/1995 | Hwang |
| 5,434,394 A | 7/1995 | Roach |
| 5,448,471 A | 9/1995 | Deaton |
| 5,450,938 A | 9/1995 | Rademacher |
| 5,452,344 A | 9/1995 | Larson |
| 5,459,306 A | 10/1995 | Stein |
| 5,467,892 A | 11/1995 | Schlamp |
| 5,475,205 A | 12/1995 | Behm |
| 5,481,094 A | 1/1996 | Suda |
| 5,482,139 A | 1/1996 | Rivalto |
| 5,495,412 A | 2/1996 | Thiessen |
| 5,504,475 A | 4/1996 | Houdou |
| 5,504,675 A | 4/1996 | Cragun |
| 5,505,449 A | 4/1996 | Eberhardt |
| 5,510,979 A | 4/1996 | Moderi |
| 5,511,646 A | 4/1996 | Maldanis |
| 5,513,117 A | 4/1996 | Small |
| 5,518,239 A | 5/1996 | Johnston |
| 5,521,364 A | 5/1996 | Kimura |
| 5,526,257 A | 6/1996 | Lerner |
| 5,536,045 A | 7/1996 | Adams |
| 5,537,314 A | 7/1996 | Kanter |
| 5,539,189 A | 7/1996 | Wilson |
| 5,544,040 A | 8/1996 | Gerbaulet |
| 5,544,288 A * | 8/1996 | Morgan et al. ................. 715/801 |
| 5,544,784 A | 8/1996 | Malaspina |
| 5,546,316 A | 8/1996 | Buckley |
| 5,548,110 A | 8/1996 | Storch |
| 5,550,746 A | 8/1996 | Jacobs |
| 5,557,721 A | 9/1996 | Fite |
| 5,564,546 A | 10/1996 | Molbak et al. |
| 5,568,406 A | 10/1996 | Gerber |
| 5,572,653 A | 11/1996 | DeTemple |
| 5,581,064 A | 12/1996 | Riley |
| 5,591,972 A | 1/1997 | Noble |
| 5,592,375 A | 1/1997 | Salmon |
| 5,592,376 A | 1/1997 | Hodroff |
| 5,592,378 A | 1/1997 | Cameron et al. |
| 5,596,501 A | 1/1997 | Comer |
| 5,602,377 A | 2/1997 | Beller |
| 5,604,901 A | 2/1997 | Kelley |
| 5,608,643 A | 3/1997 | Wichter |
| 5,611,051 A | 3/1997 | Pirelli |
| 5,611,052 A | 3/1997 | Dykstra |
| 5,612,527 A | 3/1997 | Ovadia |
| 5,612,868 A | 3/1997 | Off |
| 5,613,620 A | 3/1997 | Center |
| 5,613,679 A | 3/1997 | Casa |
| 5,615,109 A | 3/1997 | Eder |
| 5,615,269 A | 3/1997 | Micali |
| 5,619,558 A | 4/1997 | Jheeta |
| 5,620,079 A | 4/1997 | Molbak |
| 5,621,201 A | 4/1997 | Langhans |
| 5,621,640 A | 4/1997 | Burke |
| 5,621,812 A | 4/1997 | Deaton |
| 5,630,357 A | 5/1997 | Akiyama |
| 5,631,724 A | 5/1997 | Sawada |
| 5,632,010 A | 5/1997 | Briechle |
| 5,637,859 A | 6/1997 | Menoud |
| 5,638,302 A | 6/1997 | Gerber |
| 5,638,457 A | 6/1997 | Deaton |
| 5,642,484 A | 6/1997 | Harrison, III |
| 5,642,485 A | 6/1997 | Deaton |
| 5,644,723 A | 7/1997 | Deaton |
| 5,645,486 A | 7/1997 | Nagao |
| 5,649,114 A | 7/1997 | Deaton |
| 5,651,075 A | 7/1997 | Frazier |
| 5,652,421 A | 7/1997 | Veeneman |
| 5,655,007 A | 8/1997 | McAllister |
| 5,664,115 A | 9/1997 | Fraser |
| 5,665,953 A | 9/1997 | Mazzamuto |
| 5,666,493 A | 9/1997 | Wojcik |
| 5,675,662 A | 10/1997 | Deaton |
| 5,685,435 A | 11/1997 | Picioccio |
| 5,687,087 A | 11/1997 | Taggart |
| 5,687,322 A | 11/1997 | Deaton |
| 5,692,132 A | 11/1997 | Hogan |
| 5,701,252 A | 12/1997 | Facchin |
| 5,708,782 A | 1/1998 | Larson |
| 5,710,557 A | 1/1998 | Schuette |
| 5,710,886 A | 1/1998 | Christensen |
| 5,710,887 A | 1/1998 | Cheeliah |
| 5,713,795 A | 2/1998 | Kohorn |
| 5,717,866 A | 2/1998 | Naftzger |
| 5,719,396 A | 2/1998 | Jack |
| 5,724,886 A | 3/1998 | Ewald |
| 5,726,450 A | 3/1998 | Peterson |
| 5,727,163 A | 3/1998 | Bezos |
| 5,727,164 A | 3/1998 | Kaye |
| 5,732,398 A | 3/1998 | Tagswa |
| 5,732,950 A | 3/1998 | Moody |
| 5,734,150 A | 3/1998 | Brown |
| 5,734,838 A | 3/1998 | Robinson |
| 5,737,710 A | 4/1998 | Anthonyson |
| 5,739,512 A | 4/1998 | Tognazzini |
| 5,754,653 A | 5/1998 | Canfield |
| 5,758,328 A | 5/1998 | Giovannoli |
| 5,761,648 A | 6/1998 | Golden |
| 5,768,142 A * | 6/1998 | Jacobs ........................ 700/231 |
| 5,768,382 A | 6/1998 | Schneier |
| 5,769,269 A | 6/1998 | Peters |
| 5,772,510 A | 6/1998 | Roberts |
| 5,774,868 A | 6/1998 | Cragun |
| 5,774,870 A | 6/1998 | Storey |
| 5,774,874 A | 6/1998 | Veeneman |
| 5,780,133 A | 7/1998 | Engstrom |
| 5,791,990 A | 8/1998 | Schroeder |
| 5,791,991 A | 8/1998 | Small |
| 5,794,207 A | 8/1998 | Walker |
| 5,799,086 A | 8/1998 | Sudia |
| 5,799,284 A | 8/1998 | Bourquin |
| 5,802,015 A | 9/1998 | Rothschild |
| 5,806,044 A | 9/1998 | Powell |
| 5,809,144 A | 9/1998 | Sirbu |

(56) References Cited

U.S. PATENT DOCUMENTS

| | | | |
|---|---|---|---|
| 5,816,918 A | 10/1998 | Kelly |
| 5,819,981 A | 10/1998 | Cox |
| 5,822,216 A | 10/1998 | Satchell, Jr. |
| 5,822,735 A | 10/1998 | DeLapa et al. |
| 5,822,736 A | 10/1998 | Hartman |
| 5,831,862 A | 11/1998 | Hetrick |
| 5,832,457 A | 11/1998 | O'Brien |
| 5,832,458 A | 11/1998 | Jones |
| 5,835,896 A | 11/1998 | Fisher |
| 5,842,178 A | 11/1998 | Giovannoli |
| 5,842,212 A | 11/1998 | Ballurio |
| 5,844,808 A | 12/1998 | Konsmo |
| 5,845,259 A | 12/1998 | West |
| 5,845,265 A | 12/1998 | Woolston |
| 5,845,577 A | 12/1998 | Nelson |
| 5,848,399 A | 12/1998 | Burke |
| 5,850,446 A | 12/1998 | Berger |
| 5,855,007 A | 12/1998 | Jovicic |
| 5,857,175 A | 1/1999 | Day |
| 5,864,604 A | 1/1999 | Moen |
| 5,864,822 A | 1/1999 | Baker, III |
| 5,870,716 A | 2/1999 | Sugiyama |
| 5,870,717 A | 2/1999 | Wiecha |
| 5,870,719 A | 2/1999 | Maritzen |
| 5,873,069 A | 2/1999 | Reuhl |
| 5,875,110 A | 2/1999 | Jacobs |
| 5,878,139 A | 3/1999 | Rosen |
| 5,878,401 A * | 3/1999 | Joseph .......................... 705/22 |
| 5,883,810 A | 3/1999 | Franklin |
| 5,887,271 A | 3/1999 | Powell |
| 5,890,136 A | 3/1999 | Kipp |
| 5,890,718 A | 4/1999 | Byon |
| 5,905,246 A | 5/1999 | Fajkowski |
| 5,907,830 A | 5/1999 | Engel |
| 5,918,213 A | 6/1999 | Bernard |
| 5,924,078 A | 7/1999 | Naftzger |
| 5,924,080 A | 7/1999 | Johnson |
| 5,924,082 A | 7/1999 | Silverman |
| 5,926,796 A | 7/1999 | Walker et al. |
| 5,930,145 A | 7/1999 | Yuyama |
| 5,930,771 A | 7/1999 | Stapp |
| 5,937,391 A | 8/1999 | Ikeda |
| 5,938,717 A | 8/1999 | Dunne |
| 5,946,655 A | 8/1999 | Steinbiss et al. |
| 5,947,328 A | 9/1999 | Kovens |
| 5,948,038 A | 9/1999 | Daly |
| 5,956,695 A | 9/1999 | Carrithers |
| 5,959,869 A | 9/1999 | Miller |
| 5,963,452 A | 10/1999 | Etoh |
| 5,963,939 A | 10/1999 | McCann |
| 5,964,660 A | 10/1999 | James |
| 5,970,469 A | 10/1999 | Scoggie |
| 5,974,399 A | 10/1999 | Giuliani |
| 5,988,346 A | 11/1999 | Tedesco |
| 5,991,740 A | 11/1999 | Messer |
| 5,995,942 A | 11/1999 | Smith |
| 5,997,236 A | 12/1999 | Picioccio |
| 5,997,928 A | 12/1999 | Kaish |
| 5,999,914 A | 12/1999 | Blinn |
| 6,012,834 A * | 1/2000 | Dueck et al. ................ 700/238 |
| 6,014,634 A | 1/2000 | Scroggie |
| 6,016,504 A | 1/2000 | Arnold |
| 6,017,157 A | 1/2000 | Garfinkle |
| 6,021,394 A | 2/2000 | Takahashi |
| 6,024,288 A | 2/2000 | Gottlich et al. |
| 6,026,370 A | 2/2000 | Jermyn |
| 6,026,375 A | 2/2000 | Hall |
| 6,029,139 A | 2/2000 | Cunningham |
| 6,029,141 A | 2/2000 | Bezos |
| 6,035,284 A | 3/2000 | Straub |
| 6,038,551 A | 3/2000 | Barlow |
| 6,048,267 A | 4/2000 | Winchinsky |
| 6,049,777 A | 4/2000 | Sheena |
| 6,050,568 A | 4/2000 | Hachquet |
| 6,052,667 A | 4/2000 | Walker |
| 6,055,513 A | 4/2000 | Katz |
| 6,058,373 A | 5/2000 | Blinn |
| 6,058,375 A | 5/2000 | Park |
| 6,061,660 A | 5/2000 | Eggleston |
| 6,064,987 A | 5/2000 | Walker et al. |
| 6,070,147 A | 5/2000 | Harms et al. |
| 6,073,840 A | 6/2000 | Marion |
| 6,076,070 A | 6/2000 | Stack |
| 6,078,866 A | 6/2000 | Buck |
| 6,078,893 A | 6/2000 | Ouimet et al. |
| 6,080,062 A | 6/2000 | Olson |
| 6,085,168 A | 7/2000 | Mori |
| 6,101,485 A | 8/2000 | Fortenberry |
| 6,112,191 A | 8/2000 | Burke |
| 6,115,649 A | 9/2000 | Sakata |
| 6,119,099 A | 9/2000 | Walker |
| 6,131,085 A | 10/2000 | Rossides |
| 6,134,534 A | 10/2000 | Walker |
| 6,138,105 A | 10/2000 | Walker et al. |
| 6,161,059 A | 12/2000 | Tedesco et al. |
| 6,167,382 A | 12/2000 | Sparks |
| 6,192,349 B1 | 2/2001 | Husemann |
| 6,193,154 B1 * | 2/2001 | Phillips et al. ................ 235/381 |
| 6,193,155 B1 | 2/2001 | Walker |
| 6,205,435 B1 | 3/2001 | Biffar |
| 6,223,163 B1 | 4/2001 | Van Luchene |
| 6,236,971 B1 | 5/2001 | Stefik |
| 6,243,691 B1 | 6/2001 | Fisher |
| 6,247,047 B1 | 6/2001 | Wolff |
| 6,249,772 B1 | 6/2001 | Walker |
| 6,260,024 B1 | 7/2001 | Shkedy |
| 6,266,651 B1 | 7/2001 | Woolston |
| 6,267,670 B1 | 7/2001 | Walker et al. |
| 6,292,786 B1 | 9/2001 | Deaton et al. |
| 6,296,569 B1 | 10/2001 | Congello, Jr. |
| 6,298,329 B1 | 10/2001 | Walker et al. |
| 6,298,331 B1 | 10/2001 | Walker et al. |
| 6,307,958 B1 | 10/2001 | Deaton et al. |
| 6,321,201 B1 | 11/2001 | Dahl |
| 6,321,984 B1 | 11/2001 | McCall |
| 6,324,520 B1 | 11/2001 | Walker |
| 6,330,544 B1 | 12/2001 | Walker |
| 6,370,513 B1 | 4/2002 | Kolawa |
| 6,397,193 B1 | 5/2002 | Walker |
| 6,401,009 B1 | 6/2002 | Chandonnet |
| 6,405,174 B1 | 6/2002 | Walker |
| 6,467,686 B1 | 10/2002 | Guthrie |
| 6,512,570 B2 | 1/2003 | Garfinkle |
| 6,582,304 B2 | 6/2003 | Walker et al. |
| 6,584,448 B1 | 6/2003 | Laor |
| 6,587,031 B1 | 7/2003 | Daugherty |
| 6,598,024 B1 | 7/2003 | Walker et al. |
| 6,684,195 B1 | 1/2004 | Deaton |
| 6,970,837 B1 | 11/2005 | Walker |
| 7,107,221 B1 | 9/2006 | Tracy et al. |
| 7,249,050 B1 | 7/2007 | Walker et al. |
| 7,841,932 B2 | 11/2010 | Sadri et al. |
| 7,844,550 B2 | 11/2010 | Walker et al. |
| 2002/0120496 A1 | 8/2002 | Scroggie |
| 2003/0033292 A1 | 2/2003 | Meisel |
| 2003/0088465 A1 | 5/2003 | Monteverde |
| 2003/0139969 A1 | 7/2003 | Scroggie |
| 2003/0207708 A1 | 11/2003 | Sadri et al. |
| 2004/0243478 A1 | 12/2004 | Walker |

FOREIGN PATENT DOCUMENTS

| | | |
|---|---|---|
| DE | 4009980 | 1/1991 |
| DE | 4037689 | 6/1992 |
| EP | 0085546 A2 | 8/1983 |
| EP | 00109189 | 5/1984 |
| EP | 0323383 | 7/1989 |
| EP | 512413 | 11/1992 |
| EP | 0512509 A2 | 11/1992 |
| EP | 0526118 | 2/1993 |
| EP | 0619662 | 10/1994 |
| EP | 0697793 | 2/1996 |
| EP | 0779587 A2 | 9/1996 |
| EP | 0779587 A3 | 9/1996 |

(56) References Cited

FOREIGN PATENT DOCUMENTS

| | | |
|---|---|---|
| EP | 0744856 | 11/1996 |
| EP | 0817138 A1 | 1/1998 |
| EP | 0856812 A2 | 5/1998 |
| EP | 0862150 A2 | 9/1998 |
| GB | 1391060 | 4/1975 |
| GB | 2109305 A | 6/1983 |
| GB | 2265032 A | 9/1993 |
| GB | 2317257 A | 3/1998 |
| JP | 57086974 | 5/1982 |
| JP | 58132886 A | 8/1983 |
| JP | 95162556 | 12/1985 |
| JP | 600251498 | 12/1985 |
| JP | 2001093 | 1/1990 |
| JP | 2001093 A | 1/1990 |
| JP | 2171891 | 7/1990 |
| JP | 2197998 | 8/1990 |
| JP | 2208798 A | 8/1990 |
| JP | 1990-289000 | 11/1990 |
| JP | 2278399 | 11/1990 |
| JP | 04060900 | 2/1992 |
| JP | 4095198 | 3/1992 |
| JP | 4235700 A | 8/1992 |
| JP | 4260914 | 9/1992 |
| JP | 04314189 | 11/1992 |
| JP | 5242363 A | 9/1993 |
| JP | 6035946 | 2/1994 |
| JP | 7065218 A | 3/1995 |
| JP | 7078274 | 3/1995 |
| JP | 07098779 A | 4/1995 |
| JP | 95139380 | 6/1995 |
| JP | 07249176 | 9/1995 |
| JP | 7272012 | 10/1995 |
| JP | 8030848 A | 2/1996 |
| JP | 08137951 | 5/1996 |
| JP | 8-147545 | 6/1996 |
| JP | 8221484 | 8/1996 |
| JP | 8221645 A | 8/1996 |
| JP | 8329323 A | 12/1996 |
| JP | 8329350 | 12/1996 |
| JP | 09016836 A | 1/1997 |
| JP | 9062908 A | 3/1997 |
| JP | 9097288 | 4/1997 |
| JP | 9190478 A | 7/1997 |
| JP | 91909479 | 7/1997 |
| JP | H9-198554 | 7/1997 |
| JP | 10031792 | 2/1998 |
| JP | 10187820 | 7/1998 |
| JP | 10214284 | 8/1998 |
| JP | 10240830 | 9/1998 |
| JP | 10269049 | 10/1998 |
| JP | 10289372 | 10/1998 |
| JP | 10289372 A | 10/1998 |
| JP | 11088560 | 3/1999 |
| JP | 11-505343 | 5/1999 |
| JP | 2003150769 | 5/2003 |
| KR | 9503826 B | 4/1995 |
| WO | WO 97/08638 A1 | 6/1987 |
| WO | 9016033 | 12/1990 |
| WO | 94/09440 | 4/1994 |
| WO | WO 95-27242 | 10/1995 |
| WO | 96/34358 | 10/1996 |
| WO | WO 96/32701 | 10/1996 |
| WO | 96/36926 | 11/1996 |
| WO | WO 97/16797 | 5/1997 |
| WO | WO 97/20279 | 6/1997 |
| WO | WO 97/21200 | 6/1997 |
| WO | WO 97/23838 | 7/1997 |
| WO | WO 97/24701 | 7/1997 |
| WO | WO 97/25684 | 7/1997 |
| WO | WO 97/28510 | 8/1997 |
| WO | WO 97/35441 | 9/1997 |
| WO | WO 97/44749 | 11/1997 |
| WO | 97/46961 | 12/1997 |
| WO | WO 97/50064 | 12/1997 |
| WO | WO 98/06050 | 2/1998 |
| WO | WO 98/15907 | 4/1998 |
| WO | WO 98/19260 | 5/1998 |
| WO | WO 98/21713 | 5/1998 |
| WO | WO 98/28699 | 7/1998 |
| WO | 98/43149 | 10/1998 |
| WO | WO 98/48388 | 10/1998 |
| WO | WO 98/48563 | 10/1998 |
| WO | WO 98/49658 | 11/1998 |
| WO | WO 99/04326 | 1/1999 |
| WO | WO 99/07121 | 2/1999 |
| WO | WO 99/09508 | 2/1999 |
| WO | 99/11006 | 3/1999 |
| WO | WO 99/12117 A1 | 3/1999 |
| WO | 99/19809 | 4/1999 |
| WO | WO 99/38125 A1 | 7/1999 |

OTHER PUBLICATIONS

Office Action for U.S. Appl. No. 09/345,092 dated Jan. 24, 2002, 37pp.
Office Action for U.S. Appl. No. 09/345,092 dated Mar. 15, 2001, 33pp.
Office Action for U.S. Appl. No. 09/345,092 dated Oct. 22, 2002, 42pp.
Office Action for U.S. Appl. No. 09/345,092 dated Jul. 1, 2005, 17pp.
Office Action for U.S. Appl. No. 09/345,092 dated Mar. 10, 2006, 8pp.
Office Action for U.S. Appl. No. 09/345,092 dated Aug. 29, 2006, 12pp.
Notice of Allowability for U.S. Appl. No. 09/345,092 dated Sep. 29, 2006, 4pp.
Notice of Allowability for U.S. Appl. No. 09/345,092 dated Mar. 1, 2007, 4pp.
Office Action for U.S. Appl. No. 09/345,092 dated Jun. 15, 2007, 2pp.
International Search Report for Application No. PCT/US04/33811 dated Dec. 13, 2005, 3pp.
Written Opinion for Application No. PCT/US04/33811 dated Dec. 13, 2005, 3pp.
Office Action for U.S. Appl. No. 09/218,085 dated Nov. 3, 2000, 22pp.
Office Action for U.S. Appl. No. 09/218,085 dated May 23, 2007, 9pp.
Office Action for U.S. Appl. No. 09/218,085 dated Aug. 31, 2007, 2pp.
Office Action for U.S. Appl. No. 09/218,085 dated Nov. 24, 2006, 6pp.
Office Action for U.S. Appl. No. 09/218,085 dated Aug. 18, 2006, 4pp.
Office Action for U.S. Appl. No. 09/218,085 dated Mar. 9, 2006, 6pp.
Office Action for U.S. Appl. No. 09/218,085 dated Nov. 1, 2002, 24pp.
Office Action for U.S. Appl. No. 09/218,085 dated Oct. 19, 2004, 23pp.
Office Action for U.S. Appl. No. 09/218,085 dated Aug. 10, 2005, 5pp.
Office Action for U.S. Appl. No. 09/218,085 dated Jul. 8, 2001, 23 pp.
Office Action for U.S. Appl. No. 10/095,372 dated Aug. 26, 2005, 12pp.
Office Action for U.S. Appl. No. 10/095,372 dated Mar. 4, 2005, 8pp.
Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals, 2pp.
Allan Z. Gilbert, "Financial Management: A call to action for wireless data communication", Automatic Merchandiser, Aug. 1996, pp. 62-64, 3pp.
"Coupon acceptor; Coinco", Beverage Industry, Jul. 1998, No. 7, vol. 89, p. 38, 2pp.
"Coinco offers BA-30 dollar bill acceptor", Automatic Merchandiser, Aug. 1998, p. 33, 2pp.
Rich Karlgaard, "Keep your eyes on the prize", Forbes, Sep. 21, 1998, p. 43, 3pp.
"Coupon acceptor", Beverage Industry, Dec. 1998, No. 12, vol. 89, p. 34, 1pp.

(56) References Cited

OTHER PUBLICATIONS

Tim Davis, "Vending suppliers scurry to meet Coke-mandated vendor communication", Automatic Merchandiser, Aug. 1996, pp. 62-64, 2pp.
Kohda, Youji, Endo, Susumu, "Ubiquitous Advertising on the WWW: Merging Advertisement on the Browser", computer Networks and SDN Systems 28, May 1, 1996 at pp. 1493-1499, 7pp.
Henry, Anne, "High-tech vending: vending machine OEMs begin to resemble their consumer electronics counter parts when it comes to rapid-fire implementation of technology; original equipment manufacturers", Appliance, Dec. 1991, Section: vol. 48, No. 12, p. 39, ISSN: 0003-6781, 5pp.
Website: VendingMi$er, (http // www optimumenergy com/products/miser html), download date: Aug. 12, 1998, 2pp.
Brochure, "Introducing the Digital MenuBoard", Siren Technologies, Inc., (www sirentech com), 4pp.
Rehayem, Gilbert, "Opinion: X-Press Betting", Information Systems & Technology, Ontario Lottery Corp, 1pp.
Samuelson, Paul A., "Economics 8th Edition", McGraw-Hill Book Company, Copyright 1948, 1951, 4pp.
"Cape Town", Reuters Ltd, Nov. 8, 1979, PM Cycle, 1pp.
"Save the mark", Financial Times (London), Feb. 1, 1983, Section I, Men & Matters at p. 12, 1pp.
Cook, Louise, "ConsumerWatch: Clip, Snip, Save", The Associated Press, Mar. 12, 1984, Business News Section, 2pp.
Greene, Jan, "Farm bills please assns; National Grocers Association", Supermarket News, vol. 35, Dec. 23, 1985 at p. 6, 1pp.
"POS spectrum: a lottery looks to POS for growth", UMI, Inc., POS News, Jan. 1989, vol. 5, No. 7, p. 8, ISSN: 0896-6230, CODEN: BHORAD, 1pp.
Kuttner, Robert, "Computers May Turn the World Into One Big Commodities Pit", Business Week, Sep. 11, 1989, Section: Economic Viewpoint, No. 3123 at p. 17, 2pp.
Schrage, Michael, "An Experiment in Economic Theory; Labs Testing Real Markets", The Record, Nov. 26, 1989, Section: Business at p. B01, 3pp.
"Let's Play the Cash Register Receipts Lottery", The New York Times, Dec. 25, 1990, Section 1, p. 30, col. 4, Editorial Desk, 1pp.
Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082, 3pp.
"Philips offers customers financing through Citicorp; Philips Medical Systems North America, Citicorp North America Inc." Health Industry Today, Jun. 1991, Section: vol. 54, No. 6, p. 4, ISSN: 0745-4678, 1pp.
Pelline, Jeff, "Travelers Bidding on Airline Tickets SF firm offers chance for cut-rate fares" The San Francisco Chronicle, Aug. 19, 1991, Sections: News at p. A4, 3pp.
Del Rosso, Laura, "Ticket-bidding firm closes its doors; Marketel International; Brief Article", Travel Weekly, Mar. 12, 1992, Section: vol. 51, No. 21, p. 1, ISSN: 0041-2082, 2pp.
Fink, Ronald, "Data processing: Pepsico.", Financial World, Sep. 29, 1992, vol. 161, No. 19, p. 52(1), ISSN: 0015-2064, 2pp.
Gilbert, Allan Z., "Operators can gain with creative merchandising", Automatic Merchandiser, Oct. 1992, p. 80, ISSN: 1061-1797, 3pp.
"Coupons get serious; supermarkets use barcodes to prevent misredemptions", Chain Store Age Executive with Shopping Center Age, Oct. 1992, Section: vol. 68, No. 10, p. 68, ISSN: 0193-11992, 2pp.
"Winn-Dixie/The Salvation Army Report Contributions for War Against Hunger", PR Newswire, Jun. 10, 1993, Section: Financial News, 1pp.
Gelernter, David, "The Cyber-Road Not Taken; Lost on the Info-Highway? Here's Some Stuff that Could Really Change Your Life", The Washington Post, Apr. 3, 1994, Section: Outlook, p. C1, 5pp.
Jones, Jeanne, "Data Readers Streamline Management; Scanner Technology Aids Retailers As Well As Plants, Wholesalers", The Houston Post, Jun. 26, 1994, Section: Business at p. D1, 2pp.

Fiorini, Phillip, "'No Place for Penny?'/Smallest coin doesn't make cents to some", USA Today, Jul. 29, 1994, Section: News at p. 1A, 3pp.
Smith, Alison, "Survey of UK Consumer Credit and Asset Finance", Financial Times, Nov. 3, 1994, Section: p. VI, 3pp.
Website: "FAQ: CSH Coke Machine Information", Institute of Information & Computing Sciences, (http //www cs uu nl/wais/html/nadir/csh-coke-machine-info html), Feb. 4, 1995, 6pp.
Andreoli, Tom et al., "Cash Machines Offer a Whole Lotto Money for Withdrawl; An Unfortunate Juxtaposition; Block That Metaphor!; Something Street Talk; Fishy in Springfiled; State Street Sears?; Champion As Underdog; A 'Whole Language' Graduate", Crain's Chicago Business, Jun. 19, 1995, Section: News at p. 8, 2pp.
"Spain: BBV launches new card", Cards International, Jun. 22, 1995 at p. 5, 2pp.
Knippenberg, Jim, "Will local radio empires strike back?", The Cincinnati Enquirer, Jul. 23, 1995, Section: Tempo at p. F01, 1pp.
Brochure, "Cyber Bid", Net Fun Ltd., Copyright 1996, 9pp.
Maras, Elliot, "Software opens doors to scientific machine menuing", Automatic Merchandiser, Feb. 1996, Section: p. 36, ISSN: 0002-7545, 5pp.
Bonnici, Joseph et al., "Consumer issues in coupon usage: An exploratory analysis", Journal of Applied Business Research, Winter 1996/1997, Section: vol. 13, No. 1, pp. 31-40, ISSN: 08927626, CODEN: JPBEBK, 13pp.
Hadley, Kimberly, "Pastors praying anti-arson effort will burn bias", The Nashville Banner, Jul. 26, 1996, Section: News at p. A13, 1pp.
Gapper, John, "NatWest reports rise in bad debt", Financial Times, Jul. 31, 1996, Section: News: UK; at p. 09, 1pp.
"Lynx Technology: Lynx to provide business leasing programme through Schroder Leasing", M2 Presswire, Aug. 9, 1996, 2pp.
Taylor, Paul, "Towards a dream market", Financial Times (London), Sep. 4, 1996, Section: Survey—FT IT; at p. 03, 2pp.
"Public Internet Kiosks, Inc. Receives First Order for Its 'Internet Station'—The Vending Machine of the Future", PR Newswire, Sep. 16, 1996, 2pp.
Singletary, Michelle, "Electronic World, Unchecked Problem? U.S. Move to Paperless Payments Raises Worries About Those Who Don't Use Banks", The Washington Post, Mar. 4, 1997, Section: Financial at p. C01, 4pp.
Hirschfeld, David, "Increasing Profits Through Automation", Independent Vendors Association Quarterly, Apr./May/Jun. 1997, 10pp.
French, Simone A. et al., "A Pricing Strategy to Promote Low-Fat Snack Choices through Vending Machines", American Journal of Public Health, May 1997, vol. 87, No. 5, 3pp.
"Avco Financial Services", National Home Furnishing Association, (http //www homefurnish comNHFA/avco htm), download date: May 23, 1997, 2pp.
Website, "Catalina Marketing Corporation", (http //catalinamktg com/prodcdir htm), download date: May 29, 1997, 16pp.
Riordan, Teresa, "Patents; A novel approach to making a better spermicide harks back to some old-fashioned methods", The New York Times, Jun. 9, 1997, Section D, p. 2, col. 1, Business/Financial Desk, 3pp.
Nairn, Geoff, "The key to your identity: Falling costs will allow fingerprint verification to be widely used, reports Geoff Nairn", Financial Times (London), Jul. 15, 1997, Section: Technology; at p. 12, 3pp.
"The United Computer Exchange, How It All Works", (http //www uce com/howitworks html), download date: Jul. 23, 1997, 6pp.
"Classified 2000: The Internet Classifieds", Classifieds2000, Inc., (http //www classifieds2000 com/cgi-cls/Display exe?C2K+aboutus), download date: Aug. 6, 1997, 3pp.
"General trading information and terms provided by tradingfloor. com", (http //www tradingfloor com/info htm), download date: Aug. 14, 1997, 11pp.
"NASDAQ", Information Sheet, (http //home axford com/corfin/corf1 1 htm), download date: Aug. 15, 1997, 3pp.
Choate, Robert, "Why technology brings a great future for vending", Automatic Merchandiser, Oct. 1, 1997, Section: No. 10, vol. 39, p. 16, 1061-1797, 2pp.
Brochure, "For the Crew & the Customer: The Best Drive-Thru & Grill Service", Olivetti North America, Winter 1998, 2pp.

(56) References Cited

OTHER PUBLICATIONS

"VendMaster: Windows and Vending Software, Reports", (http //www vendmaster com/reports_main html), download date: Feb. 6, 1998, 13pp.

"SaveSmart—How SaveSmart Works for Consumers"; (http://savesmart.com/consumer/consumer-howitworks.html), Copyright 1998, 7pp.

"Welcome to Planet U, providers of U-pons—Internet Coupons—Internet Coupons"; (http://www.webcertificate.com:443/webcert/faq-detail.asp), Copyright 1998, 8pp.

Webcertificate, the perfect gift-giving solution . . . It's quick! It's Easy! It's Secure!; (http://www.webcertificate.com:443/webcert/faq-detial.asp), Copyright 1998, 14pp.

Shop the Marketplace, 1-800-flowers.com; (http://www.1800flowers.com/flowers/welcome.asp), Copyright 1998, 4pp.

"The Leader in Internet Shopping Systems for Supermarkets and Drug Stores", groceries online. copyright 1996 Groceries Online, Inc. (http://www.groceries-online.com/), Copyright 1996, 4pp.

"Brother Industries is pushing ahead with its new PC software . . . ", IDC Japan Report, Aug. 30, 1991, Section: vol. 17, p. 53, 1pg.

Maras, Elliot, "1995: downsizing adds costs; new strategies sought", Automatic Merchandiser, Aug. 1996, pp. 20-22, 24, 26, 28, 30, 32, 34, 36, 38, 40 and 44, 13pp.

Naik, Gautam, "In Digital Dorm, Click on Return for Soda", The Wall Street Journal, Jan. 23, 1997, Section: Online, p. B1, 3pp.

Shea, Barbara, "Read Fine Print When Comparing Car Rentals", Feb. 9, 1997, St. Louis Post-Dispatch, Section: Travel & Leisure, p. 04T, 2pp.

Website: "CSH Drink Machine(s)", (http //www csh rit edu/proj/drink html), download date: Jan. 29, 1998, 2pp.

Desjardins, Doug, "Hollywood's Investment in Online Video Retailer Gets Mixed Reviews", Video Store, Aug. 9, 1998, Section: p. 1, ISSN: 0195-1750, 3pp.

Stigler, George J., "The Theory of Price", The Macmillan Company, Copyright 1952, pp. 82-94, 214-221, 14pp.

Bowman, Jr., Ward S., "Tying Arrangements and the Leverage Problem", The Yale Law Journal, Nov. 1957, vol. 67, No. 1, pp. 19-36 (10pp.).

Stigler, George J., "The Theory of Price", The Macmillan Company, Third Edition, Copyright 1966, pp. 82-94, 208-215 (8pp).

Narasimhan, Chakravarthi, "A Price Discrimination Theory of Coupons", Marketing Science, Spring 1984, vol. 3, No. 2, pp. 128-147 (20pp.).

Judith Evans, "Who was that masked Cybershopper?; MasterCard-Visa Agreement on Credit Card security may make On-Line commerce fly", The Washington Post, View Related Topics; Feb. 2, 1996, Final Edition; Section: Financial; p. F01, 2pp.

"First Virtual Holdings Releases Beta Software for Secure Transactions on Microsoft Merchant Server", PR Newswire, Mar. 31, 1997; Section: Financial News, 2pp.

"Six vendors sign on for early electronic commerce venture", Phillips Business Information, Inc. Voice Technology News, Dec. 13, 1994; No. 25, vol. 6; ISSN: 1045-1498, 2pp.

"The easy, pain-free way to buy or lease your next car", What is autoseek; (http://www.autoseek.com/#what) download date: May 28, 1997, 4pp.

Nora Lockwood Toohey, "Macy's new gift card gets trial run in Warwick", The Providence Journal-Bulletin; Oct. 1, 1998; Section: Business; p. 1E, 2pp.

Denise Caruso, "Digital Commerce; The boom in on-line shopping adds a twist to the old quandary of how to tax interstate purchases", The New York Times, View Related Topics, Dec. 28, 1998; Late Edition—Final; Section: C; p. 3; col. 5; Business/Financial Desk, 3pp.

Godwin, Nadine, "New software was key lure in $17 million agency buyout.", Travel Weekly, Nov. 26, 1984, Section: vol. 43, p. 45, ISSN: 0041-2082, 4pp.

"Woodside Management Systems Inc. today announced . . . ", PR Newswire, Apr. 1, 1986, 2pp.

Tellis, Gerard J., " Beyond the Many Faces of Price: An Integration of Pricing Strategies", Journal of Marketing, Oct. 1986, vol. 50, pp. 146-160, 15pp.

Godwin, Nadine, "Agency, funded by 3M, set to market software; Travelmation touts trip planner to corporations; designed to eliminate client-agent telephone calls; Business Travel Update", Travel Weekly, Oct. 13, 1986, Section: vol. 45, p. 45, ISSN: 0041-2082, 4pp.

Godwin, Nadine, "Agency dares to launch its own air res system; Travelmation system provides greater versatility, Automation Report", Travel Weekly, Oct. 23, 1986, 5pp.

"Thomas Cook Travel U.S.A. has announced . . . ", PR Newswire, Jan. 12, 1987, 2pp.

Bawa, Kapil et al., "The Coupon-Prone Consumer: some Findings Based on Purchase Behavior Across Product Classes", Journal of Marketing, Oct. 1987, vol. 51, pp. 99-110, 12pp.

Nomani Sr., A., "Air Crashes Stir Signs of Anxiety in Travelers", Wall Street Journal, Aug. 1, 1989, Section 2, p. 1, col. 1, 2pp.

Carlsen, Clifford, "From Airline Tickets to Human Organs, the Electronic Markets are Booming", San Francisco Business Times, Aug. 14, 1989, Section: vol. 3, No. 50, Section 1, p. 17, 2pp.

Golden, Fran, "AAL's Riga doubts Marketel's appeal to retailers", Travel Weekly, Nov. 13, 1989, Section: vol. 48, No. 91, p. 4, ISSN: 0041-2082, 2pp.

"Letters to BusinessExtra", The San Francisco Chronicle, Dec. 26, 1989, Section: Business, C7, 3pp.

Wallace, David, "Company Planning to Let Flyers bid on Airfares", Philadelphia Business Journal, Mar. 26, 1990, Section: vol. 9, No. 3, Section 1, p. 15, 3pp.

Greenberg, Peter S., "The Savvy Traveler: Lower Air Fares for Consumers Not in the Cards . . . " Los Angeles Times, Jul. 8, 1990, Section: Travel, Part L, p. 2, col. 1, Travel Peak, 2pp.

Carey, Christopher, "Firm Offers Auction for Airline Tickets", St. Louis Post-Dispatch, Aug. 7, 1991, Section: Business, p. 1B, 2pp.

Upton, Kim, "News and Briefs: French Say Monoliths Off-Limits to Visitors", Los Angeles Times, Aug. 25, 1991, Section: Travel, Part L, p. 4, col. 1, Travel Desk, 2pp.

"Buy Low, Fly High", USA Today, Nov. 14, 1991, Section: Bonus, p. 15, 2pp.

Feldman, Joan M., "To rein in those CRSs; computer reservation systems" Air Transport World, Dec. 1991, Section: vol. 28, No. 12, p. 89, ISSN: 0002-2543, 5pp.

"Traveler's Notes; Bookit Report", Consumers Reports Travel Letter, Dec. 1991, Section: vol. 7, No. 12, p. 143, 1pg.

"CTRL's Blue Ribbon Deals for 1992", Consumer Reports Travel Letter, Jan. 1992, Section: vol. 8, No. 1, pp. 3-5, 2pp.

"Newsletters", The Atlanta Journal and Constitution, Mar. 1, 1992, Section: Travel: Section K, p. 13, 1pg.

Del Rosso, Laura, "Ticket-bidding firm closes its doors, Marketel International", Travel Weekly, Mar. 12, 1992, Section: vol. 51, No. 21, p. 1, ISSN: 0041-2082, 2pp.

Hainer, Cathy et al., "Where vacationing kids get good care", USA Today, Apr. 1, 1992, Section: Life, p. 4D, 2pp.

Weatherford, Lawrence R. and Bodily, Samuel E., "A Taxonomy and Research Overview of Perishable-Asset Revenue Management: Yield Management, Overbooking, and Pricing", Operations Research, Sep.-Oct. 1992, vol. 40, No. 5, pp. 831-844, 14pp.

Spencer, Milton H. and Amos, Jr., Orley M., "Contemporary Economics, Eight Edition", Worth Publishers, Copyright 1993, 5pp.

Rajendran, K.N. and Tellis, Gerard J., "Contextual and Temporal Components of Reference Price", Journal of Marketing, Jan. 1994, pp. 22-34. 13pp.

Feldman, Joan M., "Reclaiming control; new software to close gap between projected and actual revenues", Aug. 1995, Section: vol. 32, No. 8, p. 35, ISSN: 0002-2543, 5pp.

*United Sates v. Eastman Kodak Co.*, United States Court of Appeals for the Second Circuit, Docket No. 97-6190, decided Aug. 4, 1995, 16pp.

Bronnenberg, Bart J., "Limited Choice Sets, Local Price Response, and Implied Measures of Price Competition", Journal of Marketing Research, Spring 1996, Section: vol. XXXIII, p. 163, 20pp.

Prentice, Michael, "Searching for the lowest fare: Getting the lowest fare takes work, but it's worth the effort", The Ottawa Citizen, Oct. 9, 1996, Section: Citylife; Consuming Passion, p. C3, 3pp.

(56) References Cited

OTHER PUBLICATIONS

"Auctioning unsold airline tickets", Insight (USA), download date: Oct. 29, 1996, 1pg.
"Web Ventures presents Bookit!", (http www webventures com/bookit), Copyright 1996, 1pg.
"Salomon Brother's Maldutis Says Internet is Aviation's 'Third Revolution;' Will Earn Billions", World Airline News, Mar. 21, 1997, Section: vol. 7, No. 12, 2pp.
Feldman, Joan M., "Pricing and cybersales; Internet airline ticket sales and reservations", Feb. 1998, Section: No. 2, vol. 35, p. 64, ISSN: 0002-2543, 4pp.
Adyanthaya, Surain, "Revenue Management: the Black Art." Interavia Business & Technology, Sep. 1998, Section: No. 623, vol. 53, p. 43, ISSN: 0983-1592, 4pp.
"Airfare Bargains on the Net: About E-mail Lists", (http //travel epicurious com/travel/c_planning/02_airfares/email/intro html), Copyright 1998, 17pp.
"Airtech—FlightPass Faq", (http //www airtech com/at_flightpass/at_faqflightpass htm), download date: Oct. 5, 1998, 4pp.
Varian, Hal R., "First Monday: Differential Pricing and Efficiency", (http www firstmonday dk/issues/issue2/different/), Copyright 1996, 18pp.
Kephart, Jeff, "Price Dynamics of Vertically; Introduction", (http //www research ibm com/infoecon . . . ), Aug. 15, 1998, 3pp.
"Bookit Airfare Bidding System (Fax for Your Plane Ticket?)", Consumer Reports Travel Letter, Sep. 1991, Section: vol. 7, No. 9, pp. 97, 106, 3pp.
Nelson, Janet, "Practical Traveler; Airlines Relaxing Policy on No-Refund Tickets", The New York Times, Sep. 22, 1991, Section 5, p. 3, col. 1, Travel Desk, 4pp.
"Traveler's Notes; Easier Airfare Bidding.", Consumer Reports Travel Letter, Oct. 1991, Section: vol. 7, No. 10, p. 119, 1pp.
Website: VendMaster, "Windows for Vending PRO with Inventory", (http //www vendmaster com/pro_inv_main html), download date: Jul. 16, 1998, 2pp.
Website: Optimum Energy Group—Products, "VendingMi$er", (http //www optimumenergy com/products/miser html), download date: Aug. 12, 1998, 2pp.
Burke, Raymond R., "Virtual Shopping: Breakthrough in Marketing Research", Harvard Business Review, Mar.-Apr. 1996, pp. 120-131, 9pp.
PCT International Search Report for Application No. PCT/NO95/00060, dated Oct. 10, 1995, 3pp.
Office Action for U.S. Appl. No. 09/348,566, mailed Oct. 1, 2003, pp. 3-5, 3pp.
Anthony Joseph, "Baby the engine, and other saving tips", The Christian Science Monitor, Nov. 4, 1986, p. B10, 3p.
"Coupons & more", welcome to coolsavings.com—Copyright 1996-1999.(http://208,134.230.42/cgi-win/tempprs.exe/first.htm), 3pp.
"A personal shopping organizer for the web savvy consumer. My KillerApp offers a personalized shopping experience to meet the unique needs of every individual user". (http://www.killerapp.com/html/main/pr0004.html), Oct. 2, 1998, 2pp.
"New Wave Marketing", Promotion Times, An SCA Quarterly Newsletter—First Quarter, undated, 2pp.
Brochure: "Reaching in New Directions", First Data Corp., Merchant Services, undated, 3lpp.
"Global, Second-Generation, and Frequent-Buyer Set New Trends", Marketing News, Jun. 7, 1985, vol. 19, No. 12, p. 18, ISSN: 0025-3790, 1pg.
Lacher, Lisa, "Coupon Gimmick Registers Profits", Business Dateline, Business Record, Dec. 7, 1987, vol. 83, No. 47, Section 1, 2pp.
Stevens, Lawrence, "Hypermarket Challenge", Computerworld, Dec. 19, 1988, Section: Software & Services, 2pp.
McIntyre, Faye, "Small businesses may prefer alternatives to advertising.", South Dakota Business Review, Jun. 1989, vol. 47, No. 4, p. 1(4), ISSN: 0038-3260, 4pp.
"Safeway Introduces Store-Generated Coupons", PR Newswire, May 1, 1990, 1pg.

Ramirez, Anthony, "The Pizza Version of Dialing '911'", The New York Times, Sep. 9, 1991, Late Edition—Final, Section D, p. 1, col. 3, Financial Desk, 4pp.
Blattenberg, Robert C., "Interactive marketing: exploiting the age of addressability.", Sloan Management Review, Sep. 22, 1991, Section: vol. 33, No. 1, p. 5, ISSN: 0019-848X, 15pp.
O'Kane, Gerry, "Parking your car by computer", South China Morning Post, Mar. 23, 1993, Section: Supplement at p. 3, 3pp.
McDowell, Bill, "Frequency marketing builds repeat business; Management", Information Access Company, a Thomson Corporation Company, Reed Publishing USA, Building Supply Home Centers, Aug. 1993, No. 2, vol. 165, p. 96, ISSN: 0890-9008, 5pp.
Arend, Mark, "Debit frenzy? Not quite, but getting there", ABA Banking Journal, Apr. 1994, vol. 86, No. 4, pp. 57-61, ISSN: 0194-5947, 4pp.
Rubel, Chad, "Young firm armed with technology fights an old giant; ETM to Ticketmaster: Let's rock", American Marketing Association, Marketing News TM, Jun. 19, 1995, 3pp.
"Tecmark Reward Terminal", Tecmark Services, Inc., Copyright 1996, (http //www tecmarkinc com/terminal htm), 1pg.
McKinney, Jeff, "Merchant program could pay off for Provident", The Cincinnati Enquirer, Mar. 24, 1996, Section: Financial at p. E02, 2pp.
"Staples the Office Superstore to Participate in Visa 'Rewards for Your Home' Promotion; Savings will be offered to thousands of Visa Staples customers.", Business Wire, Mar. 25, 1996, p. 3251164, 2pp.
Retailers in small N.D. town join forces (Discount Points Corp launches Discount Points, a multi-retailer consumer discount program), Tire Business, Apr. 29, 1996, vol. 14, No. 2, p. 10, 3pp.
Wagner, Jim, "Cameras Tell Mall What Door You Use, How Often You Go", Albuquerque Tribune, Aug. 9, 1996, Section: Evening, 2pp.
Fickenscher, Lisa, "Amex to Start Free Rewards Program with Discounts on Merchandise", The American Banker, Oct. 18, 1996, Section: Credit/Debit/ATMS at p. 10, 2pp.
Fitzgerald, Kate, "Amex Program Moves Loyalty to Next Level: Custom Extras Finds a Medium Customers Can't Ignore: Billing Statements", Crain Communications Inc., Advertising Age, Nov. 4, 1996, Section: News, 2pp.
"Click this box for extra pepperoni; CyberSlice routes online orders", The Dallas Morning News, Dec. 2, 1996, Section: Business, 2pp.
"Frequent shopper programs are taking off.", Grocery Marketing, Jan. 1997, vol. 63, No. 1, p. 54, 2pp.
Fickenscher, Lisa, "Merchant: American Express Seeks to Mine Its Data on Cardholder Spending Patterns", The American Banker, Mar. 24, 1997, Section: Credit/Debit/ATMS at p. 20, 2pp.
"Dispensing the future", Lafferty Publications Limited, Electronic Payments International, May 1997, Section: Feature at p. 12, 5pp.
"Grocery shopping goes on line in many markets; Technology spurs remote ordering concept", The Dallas Morning News, May 12, 1997, Section: Business at p. 2D, 2pp.
"Industry Briefs", Phillips Business Information, Inc., Card News, Jun. 9, 1997, vol. 12, No. 11, 2pp.
Popyk, Bob, "Turn customers into torchbearers", Information Access Company, a Thomson Corporation Company, National Trade Publications, Boating Industry, Sep. 1997, No. 9, vol. 60, p. 33, ISSN: 0006-5404, 3pp.
Hoeschen, Brad, "Brookfield Square hopes mall card strikes a chord", The Business Journal of Milwaukee Inc., Business Dateline, Business Journal—Milwaukee, Sep. 12, 1997, vol. 14, No. 50 at p. 19, 2pp.
"Acxiom Case-in-Point Case Study—Bloomingdale's Inc.", "Pushing Technology's Edge Upscale department store applies database for profit", (http //www acxiom com/cip-cs-b htm), download date: Sep. 23, 1997, 2pp.
"NCR 7452 Workstation—Beyond Traditional POS", (http //www ncr com/product/retail/products/catalog/7452 shtml), download date: Sep. 23, 1997, 3pp.
"From Our Family to Yours . . . 5 Weeks of Coupon Values for a Valuable Customer", Shoprite, Wakefern Food Corporation, Copyright 1998, 1pg.
Heller, Al, "Chain Pharmacy: Forecast '98: New Technology Advances Pharmacy Productivity", Lebhar-Friedman Inc., Drug Store News, Jan. 12, 1998 at p. CP29, 3pp.

(56) References Cited

OTHER PUBLICATIONS

"Advanced Mechanics Internet Specials", (http //www metroplexweb com/advcpn2 htm), download date: Mar. 12, 1998. 2pp.
Website: "New Partners, more exciting rewards: The Membership Rewards program for 1998.", (http //www americanexpress com/rewards/news/docs/1998new_mr shtml), download date: Mar. 12, 1998, 38pp.
Website: "U.P.C. Coupon Code Guidelines Manual", (http //www uc-council org/d31-3 htm), download date: Mar. 12, 1998, 10pp.
Rubinstein, Ed, "Internet Continues to Fortify Takeout Sector for Operators", Lebhar-Friedman Inc., Nation's Restaurant News, Mar. 23, 1998 at p. 55, 5pp.
Information Packet: "My Points®—Universal Rewards Currency, MotivationNet, Inc." Apr. 1998, 29pp.
Hemsley, Steve, "Research and destroy; Point-of-purchase research provides brand managers . . . ", Centaur Communications Ltd., Marketing Week, Apr. 16, 1998, Section: Point of Purchase at pp. 33-36, (3pp).
"WellsPark Group Lauches 'V.I.P. Rewards'; the Most Comprehensive Relationship Marketing Program Ever Created by a Mall Developer", Business Wire, Inc., May 19, 1998, 2pp.
"Catching Red Light Runners", Business Communications Company, Advanced Transportation Technology News, Jun. 1998, vol. 5, No. 2, 2pp.
Amato-McCoy, Deena, "Co-Branded Acme Credit Card Rewards Loyal Users", Information Access Company, A Thomson Corporation Company, Capital Cities Media Inc., Supermarket News, Jun. 15, 1998, p. 17, ISSN: 0039-5803, 2pp.
"Acme Markets, U.S. Bancorp Debut visa Rewards Card", Phillips Business Information, Inc., Card News, Jun. 22, 1998, vol. 13, No. 12, 1pg.
Rubinstein, Ed, "Technology: Prepaid program lets Galleria guests dine 'a la Card'", Nations's Restaurant News, (http //www nrn com), Jun. 29, 1998, 1pg.
"DataCard Partners With CSI to Offer Card-Based Loyalty Solution to Merchants", Business Wire, Inc., Jul. 9, 1998, 1pg.
Albright, Mark, "Grocery savings via Web coupons", Times Publishing Company, St. Petersburg Times, Jul. 22, 1998, Section: Business at p. 1E, 2pp.
Campos, Frellie, "Discount shopping program extended to residents.", Pacific Business News, Sep. 21, 1998, vol. 36, Issue 27, p. 32, 3/5p, ISSN: 0030-8552, 3pp.
"Garage management needs", "Unit Tracking with the General Manager Professional", (http www dacobusy com/garage/idxgarg htm), download date: Mar. 16, 1999, 2pp.
"Route Sales Automation—Track customers, orders, sales, and inventory! Route accounting, . . . ", "Point of sale system carried in the palm of your hand", (http //www dacobusy com/), download date: Mar. 16, 1999, 1pg.
"Alphatech, Inc., Looking to the Future", (http //www alphatech com/), download date: Mar. 25, 1999, 1pg.
"Alphatech: Technologies and Projects", (http //www alphatech com/secondary/techpro/compvis html), download date: Mar. 25, 1999, 1pg.
"IMPS: Vehicle License Plate Recognition System", "IMPS™ Integrated Multi-Pass System State of the Art Vehicle License Plate Recognition System", (http www singapore com/optasia/imps), download date: Mar. 25, 1999, 3pp.
"MSTAR main", "Moving and Stationary Target Acquisition and Recognition (MSTAR)", (http www alphatech com/secondary/techpro/projects/mstar/MSTAR_TopLevel html), download date: Mar. 25, 1999,2pp.
"Welcome to Q Lube!", (http //www qlube com/), download date: Mar. 25, 1999, 1pg.
PCT Notification of Transmittal of the International Search Report or the Declaration for PCT/US99/22650, Dated Mar. 16, 2000, 10pp.
PCT Notification of Transmittal of the International Search Report or the Declaration for PCT/US99/21720, Dated Mar. 23, 2000, 7pp.

Website: "Pricing, The Professional Pricing Society Conference Agenda", (http //www pricing-advisor com/conf_agn htm), download date: Jun. 19, 1999, 10pp.
Press Release, "Priceline.com Delivers Savings for Flexible Travelers in Side-By-Side Price Compairson", Priceline.com, Stamford, CT, May 28, 1999, 4pp.
"Travel Industry Bellwether for All Commerce Players", Jupiter Communications, Copyright 1999, Jupiter Strategic Planning Services, 2pp.
"Circuit City to Integrate E-Commerce with store shopping; retailer's E-superstore—www.circuitcity.com—to Open in July", PR Newswire, Jun. 15, 1999; Section: Financial News, 3pp.
"Wal-Mart vs. Amazon: The fight begins"; Yahoo News, Jun. 9, 1999, 3pp.
"Mercata—Group Buying Power", (http://www.mercata.com/cgi-bin/mercata/mercata/v1/pages/home.jsp), download date: Jun. 7, 1999, 5pp.
David Lazarus, "E-Commerce, Japanese style", Wired online page, Jun. 7, 1999, 3pp.
"Kmart expands inventory via in-store kiosks", Jun. 20, 1999, RTNews; (www.retailtech.com), 1pg.
"WebVoucher", (www.pinex.co.uk/webvoucher/), download date: Mar. 14, 1999, 2pp.
Quinn, Jane Byrant, "New Cars for Less", Newsweek; Oct. 23, 1978; Section: The Columnists; p. 80, 2pp.
"My Auto Broker—Online Auto Broker", (http://www.adverlink.com/myautobroker/), download date: May 28, 1997, 4pp.
Hilts, Paul, "Technology meets commerce; electronic publishing; includes articles on the World Wide Web and the annual Military Book Show; ABA '96", Publisher's Weekly, vol. 243; No. 28; p. 43; ISSN: 0000-0019, 4pp.
"About CyberSlice", (http://www.cyberslice.com/cgi-bin/WebObjects/CyberSlice:2@httpserv01/), download date: May 6, 1997, 2pp.
"PriceWatch", (http://icon.co.za/-robo/prod01.htm), Jan. 14, 1997, 5pp.
PCT International Search Report for Application No. PCT/US97/13588, dated Dec. 4, 1997, 2pp.
Davis, Tim "Vending suppliers scurry to meet Coke-Mandated vendor communication", Automatic Merchandiser, Dec. 1992, pp. 62-64, 2pp.
Conlon et al. "Press 1 for profit." Sales and Marketing Management. Sep. 1998,6pp.
PCT International Search Report for Application No. PCT/US00/13349, dated Nov. 9, 2000, 3pp.
Burke, Raymond R. "Do You See What I See? The Future of Virtual Shopping." Journal of the Academy of Marketing Science, vol. 25, No. 4, pp. 352-360, Fall 1997, 17pp.
Office Action dated Sep. 20, 2007, U.S. Appl. No. 08/947,798, 7 pp.
Office Action dated Jun. 6, 2007, U.S. Appl. No. 08/947,798, 14 pp.
Office Action dated Dec. 18, 2006, U.S. Appl. No. 08/947,798, 21 pp.
Office Action dated Mar. 9, 2006, U.S. Appl. No. 08/947,798, 15 pp.
Office Action dated Jan. 12, 2005, U.S. Appl. No. 08/947,798, 15 pp.
Office Action dated May 20, 2004, U.S. Appl. No. 08/947,798, 16 pp.
Office Action dated Feb. 25, 2003, U.S. Appl. No. 08/947,798, 12 pp.
Office Action dated Jul. 5, 2002, U.S. Appl. No. 08/947,798, 19 pp.
Office Action dated May 8, 2001, U.S. Appl. No. 08/947,798, 23 pp.
Office Action dated Oct. 26, 2000, U.S. Appl. No. 08/947,798, 5 pp.
Office Action dated Jan. 20, 2000 for U.S. Appl. No. 08/947798, 17 pp.
International Preliminary Examination Report for Application No. PCT/US98/21216, dated Sep. 24, 1999, 4 pp.
Written Opinion for Application No. PCT/US98/05787, dated Jul. 29, 1999, 10 pp.
International Search Report for Application No. PCT/US98/05787, dated May 12, 1999, 2 pp.
Myhre, James W., "Examiner's Affidavit", dated Feb. 22, 2001, 1 pg.
Office Action for U.S. Appl. No. 11/425,228, mailed Jul. 25, 2007, 6 pp.
Office Action for U.S. Appl. No. 11/456,276 457191 mailed Dec. 31, 2007, 10 pp.
Notice of Allowance for U.S. Appl. No. 10/457,101 mailed Nov. 7, 2007, 6 pp.

(56) References Cited

OTHER PUBLICATIONS

Office Action for U.S. Appl. No. 10/457,101 mailed May 25, 2007, 13 pp.
Office Action for U.S. Appl. No. 10/457,101 mailed Oct. 20, 2006, 12 pp.
Supplemental Notice of Allowability for U.S. Appl. No. 10/457,101 mailed Dec. 11, 2007, 4 pp.
Office Action for U.S. Appl. No. 10/625,089 mailed Sep. 10, 2007, 11 pp.
Office Action for U.S. Appl. No. 10/625,089 mailed Apr. 5, 2006, 7 pp.
Office Action for U.S. Appl. No. 10/625,089 mailed Oct. 24, 2005, 7 pp.
Office Action for U.S. Appl. No. 09/107,971 mailed Feb. 2, 2004, 28 pp.
Office Action for U.S. Appl. No. 09/107,971 mailed Oct. 21, 2003, 26 pp.
Office Acton for U.S. Appl. No. 09/107,971 dated Jul. 10, 2002, 30 pp.
Office Action for U.S. Appl. No. 09/107,971 mailed Oct. 3, 2001, 24 pp.
Office Action for U.S. Appl. No. 09/045,036, mailed Dec. 11, 2007, 9 pp.
International Preliminary Report for U.S. Appl. No. 98/05787 dated Sep. 22, 1999, 9 pp.
Notice of Allowance for U.S. Appl. No. 11/456,342 dated Feb. 14, 2008, 3 pp.
Office Action for U.S. Appl. No. 08/947,798 dated Jan. 11, 2008, 6 pp.
Office Action for U.S. Appl. No. 08/947,798, dated Sep. 20, 2007, 7 pp.
Office Action for U.S. Appl. No. 08/947,798 dated Jun. 6, 2007, 14 pp.
Office Action for U.S. Appl. No. 08/947,798 dated Dec. 18, 2006, 21 pp.
Office Action for U.S. Appl. No. 08/947,798 dated Aug. 24, 2006, 8 pp.
Office Action for U.S. Appl. No. 08/947,798 dated Jul. 12, 2006, 2 pp.
Office Action for U.S. Appl. No. 08/947,798 dated Mar. 9, 2006, 15 pp.
Office Action for U.S. Appl. No. 08/947,798 dated Mar. 3, 2006, 2 pp.
Office Action for U.S. Appl. No. 08/947,798 dated Jan. 12, 2005, 15 pp.
Office Action for U.S. Appl. No. 08/947,798 dated May 20, 2004, 16 pp.
Office Action for U.S. Appl. No. 08/947,798 dated Feb. 25, 2003, 12 pp.
Office Action for U.S. Appl. No. 08/947,798 dated Dec. 12, 2002, 2 pp.
Office Action for U.S. Appl. No. 08/947,798 dated Jul. 5, 2002, 20 pp.
Office Action for U.S. Appl. No. 08/947,798 dated Aug. 16, 2001, 3 pp.
Office Action for U.S. Appl. No. 08/947,798 dated May 8, 2001, 23 pp.
Office Action for U.S. Appl. No. 08/947,798 dated Feb. 27, 2001, 1 pg.
Office Action for U.S. Appl. No. 08/947,798 dated Oct. 26, 2000, 5 pp.
Office Action for U.S. Appl. No. 08/947,798 dated Jan. 20, 2000, 17 pp.
Office Action for U.S. Appl. No. 09/012,163 dated Jul. 6, 2000, 22 pp.
Office Action for U.S. Appl. No. 09/012,163 dated Jan. 10, 2001, 13 pp.
Office Action for U.S. Appl. No. 09/012,163 dated Sep. 29, 1999, 20 pp.
Office Action for U.S. Appl. No. 09/012,163 dated Feb. 29, 2000, 7 pp.
Notice of Allowability for U.S. Appl. No. 09/012,163 dated Jul. 19, 2001, 4 pp.
Notice of Allowability for U.S. Appl. No. 09/012,163 dated Nov. 27, 2001, 4 pp.
Notice of Allowability for U.S. Appl. No. 08/822,709 (97-006) dated Jan. 16, 2001, 3 pp.
Office Action for U.S. Appl. No. 08/822,709 dated Feb. 17, 2000, 6 pp.
Office Action for U.S. Appl. No. 08/822,709 dated Oct. 8, 1999, 2 pp.
Office Action for U.S. Appl. No. 08/822,709 dated Jun. 23, 1999, 5 pp.
Decision of Petition to Make Special for U.S. Appl. No. 08/822,709 dated Sep. 5, 1997, 1 pp.
Office Action for U.S. Appl. No. 09/836,409 dated Oct. 1, 2001, 6 pp.
Interview Summary for U.S. Appl. No. 09/836,409 dated Apr. 29, 2002, 2 pp.
Notice of Allowability for U.S. Appl. No. 09/836,409 dated May 1, 2002, 3 pp.
Notice of Allowability for U.S. Appl. No. 09/836,409 dated Sep. 25, 2002, 3 pp.
Office Action for U.S. Appl. No. 09/836,409 dated Nov. 20, 2002, 4 pp.
Notice Allowability for U.S. Appl. No. 09/836,409 dated Jan. 7, 2003, 3 pp.
Notice of Allowability for U.S. Appl. No. 10/424,362 dated Nov. 4, 2004, 6 pp.
Office Action for U.S. Appl. No. 10/424,362 dated Sep. 24, 2004, 3 pp.
Office Action for U.S. Appl. No. 10/424,362 dated Jun. 9, 2004, 7 pp.
Office Action for U.S. Appl. No. 10/424,362 dated Nov. 19, 2003, 10 pp.
Office Action for U.S. Appl. No. 11/058,653 dated May 15, 2007, 5 pp.
Office Action for U.S. Appl. No. 11/425,211 dated Mar. 26, 2008, 5 pp.
Office Action for U.S. Appl. No. 11/425,211 dated Sep. 15, 2006, 2 pp.
Office Action for U.S. Appl. No. 11/425,228 dated Jul. 25, 2007, 6 pp.
Notice of Allowability for U.S. Appl. No. 08/920,116 dated Oct. 25, 1999, 7 pp.
Office Action for U.S. Appl. No. 08/920,116 dated Oct. 1, 1999, 7 pp.
Office Action for U.S. Appl. No. 09/442,754 dated Aug. 2, 2000, 10 pp.
Office Action for U.S. Appl. No. 09/442,754 dated Oct. 16, 2001, 9 pp.
Office Action for U.S. Appl. No. 09/442,754 dated Aug. 1, 2001, 6 pp.
Notice of Allowability for U.S. Appl. No. 09/442,754 dated Oct. 18, 2001, 4 pp.
Notice of Allowability for U.S. Appl. No. 09/442,754 dated Jan. 7, 2003, 8 pp.
Supplemental Notice of Allowability for U.S. Appl. No. 09/442,754 dated Mar. 4, 2003, 5 pp.
Office Action for U.S. Appl. No. 09/442,754 dated Mar. 6, 2003, 2 pp.
Notice of Noncompliant Amendment for U.S. Appl. No. 10/625,089 dated Sep. 10, 2007, 11 pp.
Office Action for U.S. Appl. No. 10/625,089 dated Jun. 20, 2007, 2 pp.
Office Action for U.S. Appl. No. 10/625,089 dated Apr. 5, 2006, 7 pp.
Office Action for U.S. Appl. No. 10/625,089 dated Oct. 24, 2005, 7 pp.
Office Action for U.S. Appl. No. 10/625,089 dated Sep. 10, 2007, 11 pp.
Foreign Office Action for Serial No. 2284662 dated Jan. 29, 2003, 3 pp.
Notice of Allowance for Serial No. 2284662 dated Oct. 3, 2003, 1 pg.
Foreign Office Action for Serial No. 98913082.8 dated Jul. 24, 2006, 4 pp.
Foreign Office Action for Serial No. 545921/98 dated 02/07/03, 5 pp.
International Search Report for Application No. PCT/US99/01089 dated May 11, 1999, 1 pp.
Office Action for U.S. Appl. No. 09/164,670 (98-040) dated May 11, 2000, 10 pp.
Office Action for U.S. Appl. No. 09/164,670 dated Jan. 4, 2001, 8 pp.
Notice of Allowance for U.S. Appl. No. 09/164,670 dated Jul. 16, 2001, 4 pp.

(56) References Cited

OTHER PUBLICATIONS

International Search Report for PCT/US96/13718 dated Nov. 7, 1996, 3 pp.
European Search Report for EP 97/122695 dated Nov. 10, 1998, 3 pp.
International Search Report for PCT/US98/17340 dated Dec. 17, 1998, 1 pg.
International Search Report for EP 97/122899 dated Aug. 9, 1999, 2 pp.
Written Opinion for Application No. PCT/US99/01089 dated Feb. 1, 2000, 4 pp.
Preliminary Exam Report for Application No. PCT/US99/01089 dated Jan. 22, 2000, 4 pp.
Office Action for U.S. Appl. No. 11/761,842 mailed Mar. 31, 2010, 9 pp.
Notice of Allowance for U.S. Appl. No. 11/456,355 mailed Dec. 29, 2010, 6 pp.
Notice of Allowance for U.S. Appl. No. 11/456,355 mailed Aug. 11, 2010, 8 pp.
Office Action for U.S. Appl. No. 11/456,355 mailed May 13, 2009, 6 pp.
Office Action for U.S. Appl. No. 11/456,355 mailed Dec. 30, 2008, 9 pp.
Office Action for U.S. Appl. No. 11/456,355 mailed Jul. 9, 2008, 7 pp.
Office Action for U.S. Appl. No. 11/456,355 mailed Feb. 21, 2008, 17 pp.
Notice of Allowance for U.S. Appl. No. 10/095,372 mailed Feb. 12, 2007, 18 pp.
Office Action for U.S. Appl. No. 11/761,791 mailed Mar. 31, 2010, 7 pp.
Notice of Allowance for U.S. Appl. No. 10/625,089 mailed Oct. 6, 2008, 10 pp.
Notice of Allowance for U.S. Appl. No. 10/625,089 mailed Apr. 2, 2008, 10 pp.
Notice of Allowance for U.S. Appl. No. 12/420,397 mailed May 17, 2010, 9 pp.
Office Action for U.S. Appl. No. 12/420,397 mailed Oct. 9, 2010, 6 pp.
Notice of Allowance for U.S. Appl. No. 08/947,798 mailed Feb. 6, 2009, 4 pp.
Office Action for U.S. Appl. No. 08/947,798 mailed Nov. 25, 2008, 24 pp.
Office Action for U.S. Appl. No. 08/947,798 mailed May 5, 2008, 25 pp.
Notice of Allowance for U.S. Appl. No. 11/926,768 mailed Nov. 16, 2009, 7 pp.
Office Action for U.S. Appl. No. 11/926,768 mailed Jun. 17, 2009, 24 pp.
Office Action for U.S. Appl. No. 11/926,839 mailed Jul. 8, 2010, 24 pp.
Office Action for U.S. Appl. No. 11/926,839 mailed Mar. 17, 2010, 23 pp.
Notice of Allowance for U.S. Appl. No. 11/926,948 mailed Jun. 14, 2010, 7 pp.
Office Action for U.S. Appl. No. 11/926,948 mailed Nov. 12, 2009, 17 pp.
Office Action for U.S. Appl. No. 11/926,948 mailed Feb. 24, 2009, 16 pp.
Office Action for U.S. Appl. No. 11/926,948 mailed Sep. 8, 2008, 14 pp.
Notice of Allowance for U.S. Appl. No. 11/058,653 mailed Jul. 22, 2008, 5 pp.
Notice of Allowance for U.S. Appl. No. 11/058,653 mailed Mar. 4, 2008, 8 pp.
Notice of Allowance for U.S. Appl. No. 11/425,211 mailed Feb. 9, 2009, 7 pp.
Notice of Allowance for U.S. Appl. No. 11/425,228 mailed Oct. 8, 2008, 7 pp.
Office Action for U.S. Appl. No. 11/425,228 mailed May 12, 2008, 8 pp.
Office Action for U.S. Appl. No. 11/425,232 mailed Mar. 18, 2008, 6 pp.
Notice of Allowance for U.S. Appl. No. 11/456,342 mailed May 1, 2008, 4 pp.
Notice of Allowance for U.S. Appl. No. 11/296,948 mailed Sep. 29, 2010, 6 pp.
Office Action for U.S. Appl. No. 11/926,768 mailed Dec. 23, 2010, 24 pp.
Notice of Allowance for U.S. Appl. No. 11/456,355 mailed Sep. 29, 2010, 6 pp.
Notice of Allowance for U.S. Appl. No. 11/456,355 mailed May 11, 2010, 8 pp.

\* cited by examiner

| PRODUCT IDENTIFIER 410 | DISPENSER IDENTIFIER 412 | AVAILABLE INVENTORY 414 | INDIVIDUAL PRICE 416 | COMPONENT PRICE 418 | ITEM CATEGORY 420 |
|---|---|---|---|---|---|
| COLA | A1 | 6 | $0.75 | $0.50 | SODA |
| ORANGE | A2 | 0 | $0.75 | $0.40 | SODA |
| ROOT BEER | A3 | 5 | $0.75 | $0.30 | SODA |
| BUBBLE | B1 | 3 | $0.75 | $0.30 | GUM |
| MINT | B2 | 5 | $0.45 | $0.25 | GUM |
| FRUIT | B3 | 0 | $0.45 | $0.20 | GUM |
| REGULAR | C1 | 4 | $0.65 | $0.40 | CHIPS |
| LOW FAT | C2 | 7 | $0.70 | $0.45 | CHIPS |
| SOUR CREAM | C3 | 5 | $0.75 | $0.50 | CHIPS |

| PACKAGE IDENTIFIER 510 | PACKAGE PRICE 512 | PACKAGE COMPONENT IDENTIFIER 1 514 | PACKAGE COMPONENT IDENTIFIER 2 516 | PACKAGE COMPONENT IDENTIFIER 3 518 | STATUS 520 | RULES IDENTIFIER 522 |
|---|---|---|---|---|---|---|
| P1 | $1.00 | A1 | C1 | N/A | ACTIVE | R1 |
| P2 | $1.30 | A1 | B1 | C3 | INACTIVE | R2 |
| P3 | $1.20 | A2 | B1 | C3 | ACTIVE | R2 |
| P4 | $1.10 | A3 | B1 | C3 | ACTIVE | R2 |
| P5 | $0.95 | A1 | C2 | N/A | ACTIVE | OPERATOR |

| RULE IDENTIFIER 610 | RULE PRICE 612 | COMPLEMENTARY PRODUCT CATEGORIES 614 | PACKAGE OFFER TYPE 616 |
|---|---|---|---|
| R1 | $1.00 | SODA, CHIPS | UPSELL |
| R2 | ≥ $2.25 | SODA, GUM, CHIPS | PERIODIC |

FIG. 6

METHOD AND APPARATUS FOR VENDING A COMBINATION OF PRODUCTS

CROSS-REFERENCE TO RELATED APPLICATIONS

The present application is a continuation of U.S. patent application Ser. No. 10/095,372, entitled "METHOD AND APPARATUS FOR VENDING A COMBINATION OF PRODUCTS", filed Mar. 11, 2002, now U.S. Pat. No. 7,233,912 and issued Jun. 19, 2007; which is a continuation-in-part of U.S. patent application Ser. No. 09/012,163, entitled "METHOD AND APPARATUS FOR AUTOMATICALLY VENDING A COMBINATION OF PRODUCTS", filed Jan. 22, 1998, and issued on May 28, 2002 as U.S. Pat. No. 6,397,193; which is a continuation-in-part of both:

(i) U.S. patent application Ser. No. 08/947,798 entitled "METHOD AND APPARATUS FOR DYNAMICALLY MANAGING VENDING MACHINE INVENTORY PRICES" filed Oct. 9, 1997, now U.S. Pat. No. 7,546,277 and (ii) U.S. patent application Ser. No. 08/920,116 entitled "METHOD AND SYSTEM FOR PROCESSING SUPPLEMENTARY PRODUCT SALES AT A POINT-OF-SALE TERMINAL" filed Aug. 26, 1997, and issued on Sep. 12, 2000 as U.S. Pat. No. 6,119,099.

The entirety of each of the above applications is incorporated by reference herein as part of the present disclosure.

The present application is also related to:

(i) U.S. patent application Ser. No. 11/761,791 filed Jun. 12, 2007 in the name of Walker et al. and entitled, "METHOD AND APPARATUS FOR VENDING A COMBINATION OF PRODUCTS", now abandoned, and (ii) U.S. patent application Ser. No. 11/761,842 filed Jun. 12, 2007 in the name of Walker et al. and entitled, "METHOD AND APPARATUS FOR VENDING A COMBINATION OF PRODUCTS", also now abandoned.

BACKGROUND OF THE INVENTION

The present invention relates generally to vending machines.

Although the basic advantages of vending machines are significant, prior art vending machines have several disadvantages when compared to traditional merchandising.

For example, vending machines do not actively sell to customers as a salesperson would. Thus, vending machines do not strongly induce customers to purchase anything in particular. Vending machines may not effectively sell low demand items or items of inferior quality. In addition, vending machines may not effectively sell a product for an appropriate price. Although conventional vending machines allow an operator to adjust the prices of products, such operators often have imperfect information regarding appropriate prices.

BRIEF DESCRIPTION OF THE DRAWINGS

FIG. 4 depicts an exemplary inventory table stored in the memory of the vending machine of FIG. 1.

FIG. 5 depicts an exemplary package offer table stored in the memory of the vending machine of FIG. 1.

FIG. 6 depicts an exemplary automatic package rules table stored in the memory of the vending machine of FIG. 1.

DETAILED DESCRIPTION OF THE INVENTION

Applicants have recognized that a vending machine

Various embodiments of the present invention are advantageous. For example, certain embodiments deal favorably with perishable inventory. Certain embodiments promote the sale of low demand products. Certain embodiments promote the sale of products having quality which are inferior and/or which are perceived to be inferior.

For the purposes of this disclosure, the following terms will have the corresponding definitions unless otherwise indicated:

| | |
|---|---|
| Complementary Product: | A product that may be advantageously paired with a second product (which is not necessarily a different product). For example, a complementary product may be paired with a second product by price or product type. |
| Component: | A product that is part of a package. |
| Component Price: | The price of a unit of a product sold as part of a package. |
| Individual Price: | The price of a unit of a product sold separately. |
| Package: | A combination of a plurality of component products. |
| Package Price: | The price for a package. |
| Product: | A classification of merchandise, such as a particular brand of soda, a particular flavor of soda, a particular size of soda. |
| Unit: | A single item of a product, such as a can of product. |

Figure 1:
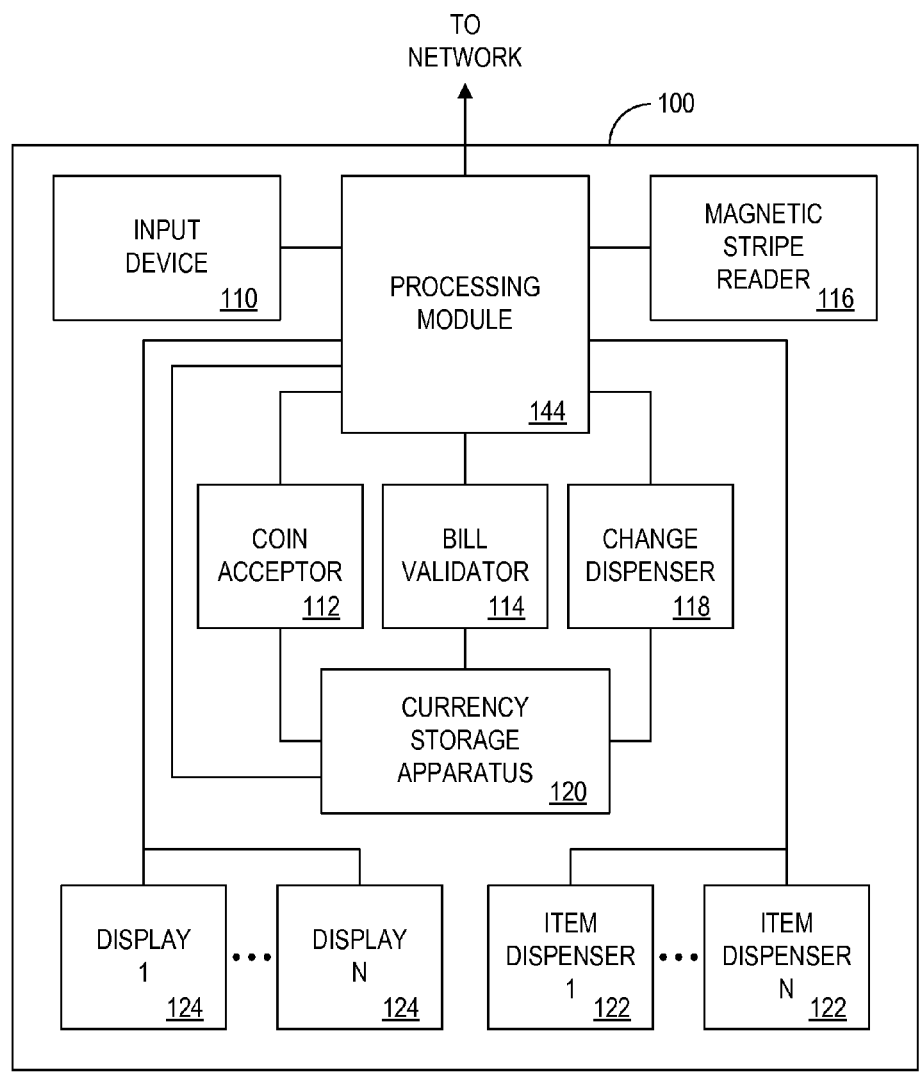
FIG. 1 is a block diagram depicting components of a vending machine according to an embodiment of the present invention.
Figure 2:
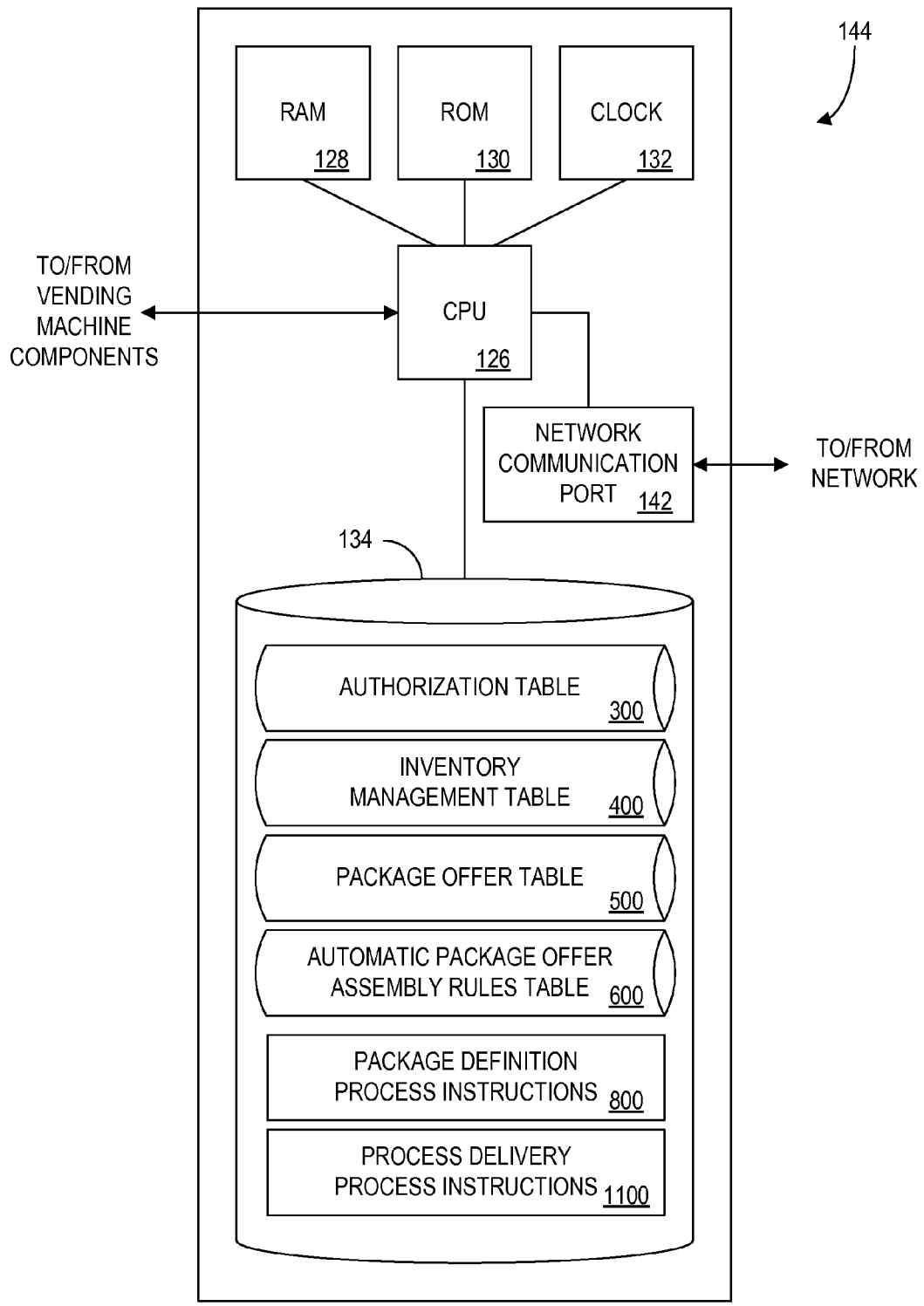
FIG. 2 is a block diagram depicting components of a processing module of the vending machine of FIG. 1.

An embodiment of the method and apparatus of the present invention will now be discussed with reference to FIGS. 1-2. FIGS. 1 and 2 illustrate the components of one exemplary vending machine 100 including the features of an embodiment of the present invention. Although specific exemplary vending machine 100 is referred to throughout the detailed description, various embodiments of the present invention are directed to any automatic sales machine (e.g., ATMs) that allows payment to be exchanged for goods. Payment can be presented through a variety of media including, but not limited to, coins, bills and other currencies, magnetic stripe cards and smart cards (whether pre-paid or linked to an account), and identification codes. FIG. 1 is a schematic block diagram of vending machine 100; and FIG. 2 is a schematic block diagram of processing module 144 of vending machine 100.

As shown, vending machine 100 includes an input device 110 for receiving input from a customer indicating a product selection. Input device 110 may also be used for receiving input from an operator during stocking or maintenance of vending machine 100. Input device 110 preferably includes a set of alpha-numeric keys for providing input to vending machine 100. Alternatively, input device 110 could include a selector dial, a set of buttons associated with a respective set of item dispensers, or any other conventional input device commonly employed by a vending machine designer. Further, vending machine 100 may include more than one input device 110. For example, vending machine 100 may include an exterior input device 110 for receiving customer input and an interior input device (not shown) for receiving operator input. In the illustrated embodiment, input device 110 provides the dual functionality of receiving input data from both operators and customers.

Vending machine 100 also includes several mechanisms for receiving payment and dispensing change, including coin acceptor 112, bill validator 114, magnetic stripe reader 116 and change dispenser 118. Magnetic stripe reader 116 is a conventional reader for reading data on the magnetic stripe of a credit or debit card, and it may cooperate with conventional point-of-sale credit card processing equipment (not shown) to validate card-based purchases through a conventional transaction authorization network. Coin acceptor 112, bill validator 114 and change dispenser 118 communicate with currency storage apparatus 120 and may be conventional devices such as Mars models AE-2400, MC5000, TRC200 or CoinCo model 9300-L. Coin acceptor 112 and bill validator 114 receive and validate currency that is stored by currency storage apparatus 120. Change dispenser 118 activates the return of coinage to the customer.

Referring now to FIG. 2, with continuing reference to FIG. 1, components of vending machine 100, including input device 110, coin acceptor 112, bill validator 114, magnetic stripe reader 116, change dispenser 118, and currency storage apparatus 120, communicate with, and are controlled by, processing module 144. Processing module 144 includes network communication port 142 for communicating with a central server (not shown).

In addition to the elements previously mentioned, processing module 144 includes a central processing unit 126 ("CPU") connected to network communication port 142. CPU 126 communicates with random access memory (RAM) 128, read only memory (ROM) 130 and clock 132. CPU 126 also communicates with at least one item dispenser 122, at least one display 124, and storage device 134.

For example, one or more of CPU 126, input devices(s) 110, RAM 128, ROM 130, output device(s) and storage device 134 may be included, wholly or partially, in a separate device, such as the e-Port™ by USA Technologies Inc., that is in communication with a vending machine (e.g., a vending machine manufactured by Crane Co. or Stentorfield Ltd, an ATM, a kiosk.). The separate device may also be in communication with a network such as the Internet.

The e-Port™ is a credit and smart card-accepting unit that controls access to office and MDB vending equipment, and serves as a point of purchase credit card transaction device. The e-Port™ includes an LCD that allows for the display of color graphics, a touch sensitive input device (touch screen) that allows users to input data to the device. The display may be used to prompt users interactively with, e.g., advertising messages (which may be derived dynamically via a network), an ordering sequence or other instructions, and information about their transaction status. Such information and content can be drawn by the e-Port™ through the Internet or submitted directly to the e-Port™. User response information may be retrieved from the e-Port™ through the Internet or directly, and thereby collected by, e.g., a server in communication with the e-Port™ via a network.

The separate device may alternatively be a programmed computer running appropriate software for performing the necessary functions described herein.

The separate device may be operable to receive input from purchasers, receive payment from purchasers, exchange information with a remotely located server and/or display messages to purchasers. The separate device may be operable to instruct the vending machine that appropriate payment has been received (e.g., via a credit card read by the separate device) and/or that a particular product should be dispensed by the vending machine.

Vending machine 100 includes multiple item dispensers 122 and multiple corresponding displays 124. In the embodiment of the present invention described herein, each item dispenser 122 and display 124 pair will be described as corresponding to a unique product offered for sale by vending machine 100. One of ordinary skill in the art will recognize that an embodiment of the present invention may be implemented in a vending machine in which multiple item dispenser 122 and display 124 pairs may correspond to a single product.

As shown in FIG. 1, each item dispenser 122 has a corresponding display 124 that displays information pertaining to the product dispensed by item dispenser 122. Typically, display 124 will display the individual price of the corresponding product. Although vending machine 100, as illustrated, includes a plurality of item dispensers 122 and a plurality of displays 124, this is only one possible embodiment of the many types of vending machines. Selecting an appropriate conventional item dispensing mechanism, a single item dispenser 122 could be used to dispense items of a plurality of products. Likewise, a single display 124 could be used to communicate prices and other information regarding the plurality of products.

The vending machine 100 may be in communication with a remote computer, such as a server, that provides the vending machine 100 with, e.g., all or some of the data described herein. In certain embodiments, the server may comprise certain elements or portions of certain elements such as storage device 134 and display 124.

In such an embodiment, the remote computer could be accessible, directly or indirectly, by a second computer communicating over the Internet or other network. Accordingly, a customer or other operator of the second computer could communicate with the remote computer via a Web browser. The second computer could, e.g., receive from the remote computer messages described herein as being output by the vending machine, transmit to the remote computer input described herein as being provided to the vending machine.

Similarly, various data described herein as received through input device 110 may be received through a Web browser communicating with a remote server, which in turn communicates with the vending machine As shown in FIG. 2, storage device 134 stores a database of authorization, inventory and package data, including an authorization table 300, an inventory table 400, a package offer table 500 and an automatic package rules table 600. Tables 300-600 comprise at least a portion of the data stored by storage device 134 and are described more fully with reference to FIGS. 3-6, respectively. Storage device 134 further includes instructions for implementing various process steps. Specifically, storage device 134 includes instructions enabling at least one package definition process 800 and instructions enabling at least one package delivery process 1100. Storage device 134 is preferably a magnetic disk drive, but could be a CD-ROM drive, optical disk drive, RAM drive or any other conventional storage device as would be deemed appropriate by one of ordinary skill in the art.

Figure 3:
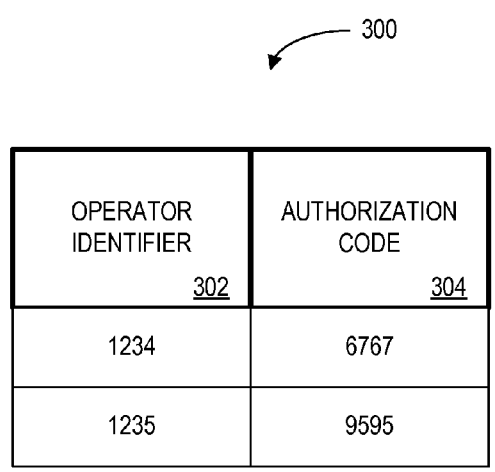
FIG. 3 depicts an exemplary authorization table stored in a memory of the vending machine of FIG. 1.

FIG. 3 illustrates the contents of an exemplary authorization table 300 in tabular format. Each record of authorization table 300 includes an operator identifier 302 and an authorization code 304 that defines a valid operator identifier/authorization code pair. Authorization table 300 is utilized to enable only authorized operators to access the price management data stored in storage device 134.

Referring now to FIG. 4, there is illustrated an exemplary inventory table 400. Each record of inventory table 400 represents inventory data associated with a product dispensed by vending machine 100. The contents of product identifier field 410 uniquely identifies a record of table 400. Dispenser identifier field 412 stores data identifying a corresponding item dispenser 122, and uniquely identifies a record of table 400 in the present embodiment.

Inventory table 400 also includes available inventory field 414 for storing a quantity of available items associated with product identifier 410. Available inventory field 414 is updated by an operator upon stocking vending machine 100 to reflect the number of items stocked. Vending machine 100 includes processing instructions for updating available inventory field 414 upon each sale of a product, including a sale of a product as a component of a package, to maintain an accurate indication of the quantity of every product and to determine the validity of every package offer.

Inventory table 400 further includes at least two price fields: individual price field 416 and component price field 418. Individual price field 416 stores data defining the price of an item of a product dispensed by the associated item dispenser 122. This price is preferably displayed to a consumer using an associated display 124. Component price field 418 stores data representing the price a unit of the associated product when sold as a component of a package. This price is preferably not displayed to a consumer directly, but may be used to calculate a package price which is displayed or otherwise output to a consumer. This permits the operator of vending machine 100 to alter the price of a product as a component of a package without affecting the price, and thereby the demand, of the product sold separately.

As shown, inventory table 400 also includes item category field 420 for storing a broad classification of the product dispensed by the associated item dispenser 122. The contents of this field may be used to identify complementary products that may be suggested to a consumer according to a method of an embodiment of the present invention.

Figure 8:
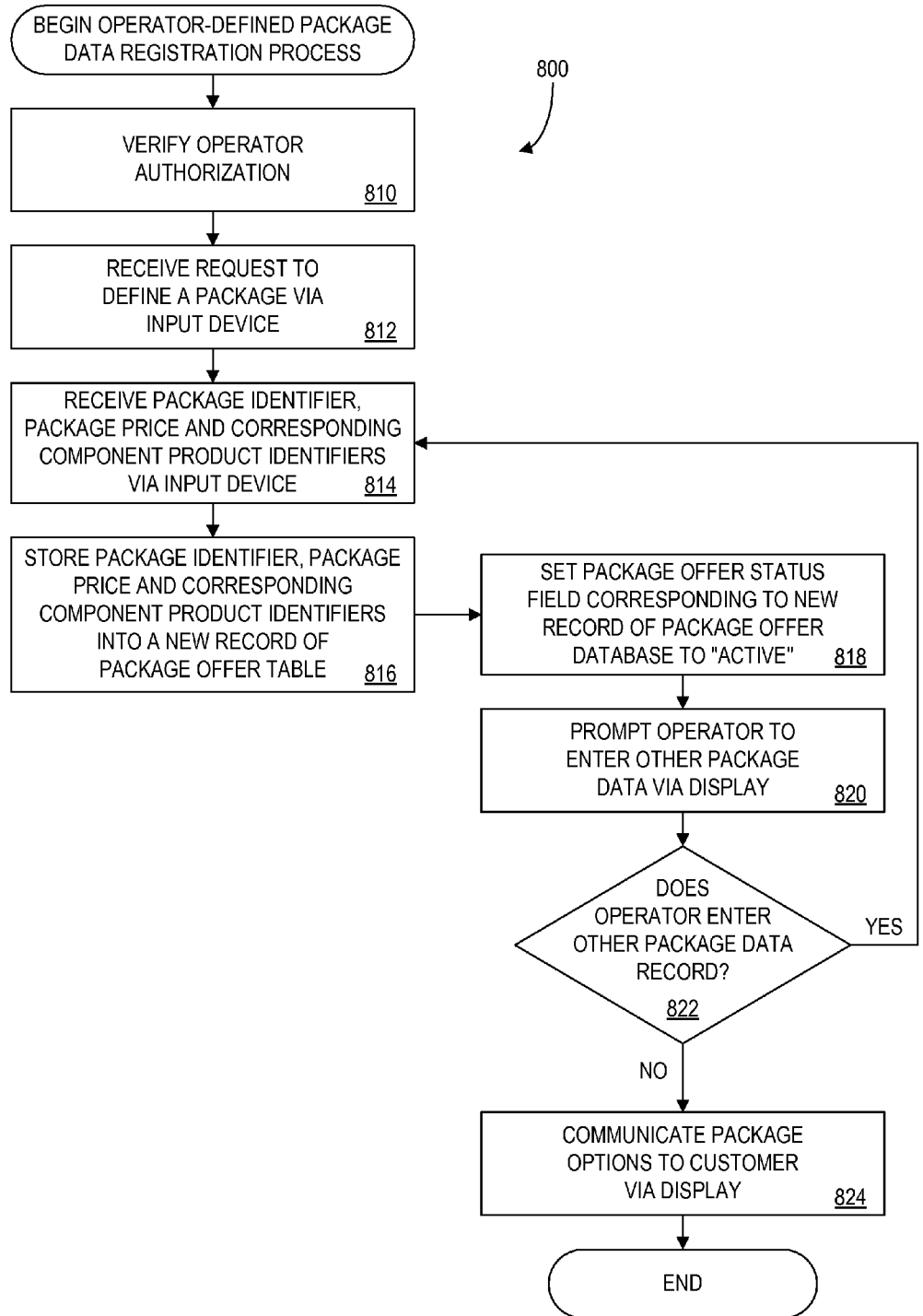
FIG. 8 is a flow chart illustrating the computer-implemented process steps enabling an operator to define a package.

Referring now to FIG. 5, an exemplary package offer table 500 is depicted. Each record of package offer table 500 represents a combination of component products offered at a single price. As illustrated in the discussion of FIGS. 8 and 9 below, the records of package offer table 500 may be generated by the operator of vending machine 100 or may be automatically generated based on processing instructions stored in storage device 134 of vending machine 100.

Package offer table 500 includes a package identifier field 510 for storing data which uniquely identifies a record of package offer table 500. Package price field 512 stores the combined prices for all component products. Package component identifier fields 514, 516 and 518 store product identifiers of the components of a package. While three component identifier fields are illustrated in FIG. 5, more or fewer component identifiers may be associated with a package.

Package offer table 500 further includes purchase status field 520 for storing data representing a status of the package. Examples of valid status data include "active" "inactive." More specific status data may, of course, be employed based on the specific implementation. The contents of purchase status field 520 illustrated by record 534 of table 500 indicates that the associated package is unavailable. A number of conditions may render a package unavailable. For example, a package may be unavailable due to a sold out or expired component product.

Package offer table 500 also includes definition identifier field 522 for storing an identifier indicating how the package offer table record was defined. According to table 500, package offer records may be defined based on operator input or an automatic package rule, described more fully with reference to FIG. 6.

Referring now to FIG. 6, there is depicted an exemplary automatic package rules table 600. Table 600 may be used in one embodiment of the present invention to automatically assemble a package of component products to offer to a consumer. Every record of table 600 is assigned a unique rule identifier stored in rule identifier field 610. Table 600 also includes a rule price field 612 representing the price of the package to be automatically assembled. Table 600 further includes a complementary product categories field 614 representing a list of complementary categories included in the package.

Package offer type field 616 stored data representing a description of the offer type. As shown, record 606 is an upsell offer and record 608 is a periodic offer. Thus, vending machine 100 may be programmed to limit the availability of the packages corresponding to these rules. Offers corresponding to automatic package rule 606 may only be presented as an upsell as described with reference to FIG. 12, and offers corresponding to automatic package rule 608 may be updated periodically as described with reference to FIGS. 9A-9D.

Having thus described architecture and components, the operation of an apparatus will now be described in greater detail with reference to FIGS. 7-13, and continuing reference to FIGS. 1-6. It is to be understood that the software instructions necessary to provide the functionality described herein are preferably stored in storage device 134 of vending machine 100, but may be stored in ROM 130.

As disclosed in U.S. patent application Ser. No. 08/947,798, the entirety of which is incorporated herein by reference, the sales or sales per time of a particular vending machine may be readily determined from, e.g., stored data indicated which units were dispensed. Such sales information may be used to calculate demand for various products and in particular how demand changes with time and with other factors.

Figure 7:
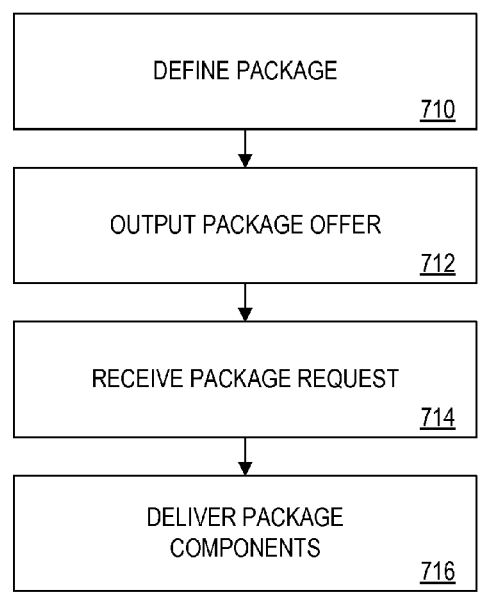
FIG. 7 is a block diagram illustrating the basic processing functions of an embodiment of the present invention.

Referring now to FIG. 7, general functionality is illustrated in block diagram format. Block 710 represents the process of defining a package comprising component products. The definition of a package may be accomplished in a number of ways, including receiving specific product data received from a vending machine operator, referring to automatic package rules stored in storage device 134, receiving specific product data from a customer, or a combination of these ways. The process steps enabling package definition according to these alternative embodiments are described with reference to FIGS. 8-10.

Block 712 represents communication of a package offer to a customer. Although accomplishing this function may be as simple as placing an advertisement near vending machine 100, this function may be performed by outputting a message (e.g., via display 124 of vending machine 100 or other output device). The communication of the package offer may also be performed by, e.g., a computer operating a web browser or other software to communicate with another computer.

Block 714 represents receiving a package request from a customer indicating a desire to purchase multiple component products for a single price. This function may include receiving a package identifier from the customer, but it may alternatively include receiving a response to a suggestive sales message provided by vending machine 100. A suggestive sell is an offer to sell a product. Such offers are typically made by the vending machine, but may be made by other devices with or without the direction of the vending machine.

Block 716 represents delivery of the component products comprising the package to the customer. The process steps for accomplishing delivery of a package according to several alternative embodiments are described with reference to FIGS. 11-13. It should be noted that delivery of different component products may be made at different vending machines.

Referring now to FIG. 8, the process steps executed by CPU 126 to permit an operator to define a package will be described. At step 810, CPU 126 performs a routine to verify the authorization of the operator using authorization table 300. The routine represented by step 810 may be performed in any number of ways that are well known to one of ordinary skill. At step 812, CPU 126 receives via input device 110 an operator-generated request to define a package. CPU 126 further receives package definition data via input device 110, as indicated by step 814. The package definition data includes a package identifier, a package price and at least one corresponding component product identifier. At step 816, the received package definition data is then stored in a record of package offer table 500. At step 818, CPU 126 sets status field 520 of the relevant record of package offer table 500 to "ACTIVE."

Once the relevant package data has been defined and stored, CPU 126 prompts the operator to enter other package data, as indicated at step 820. If the operator indicates a desire to continue defining packages, decision step 822 directs CPU 126 to continue processing at step 814. Otherwise, CPU 126 processes step 824 and communicates the defined package offers to customers via display 124, thereby completing the operator-defined package data registration process.

In addition to instructions for an operator-defined package data registration process, instructions for an automatic package definition process may be included. Such a process directs CPU 126 to automatically populate records of package offer table 500 based on pre-defined criteria. CPU 126 examines every record in automatic package rules table 600, identifies combinations of records in inventory table 400 that meet the rules criteria and creates a record in package offer table 500 for every acceptable combination.

Figure 9A:
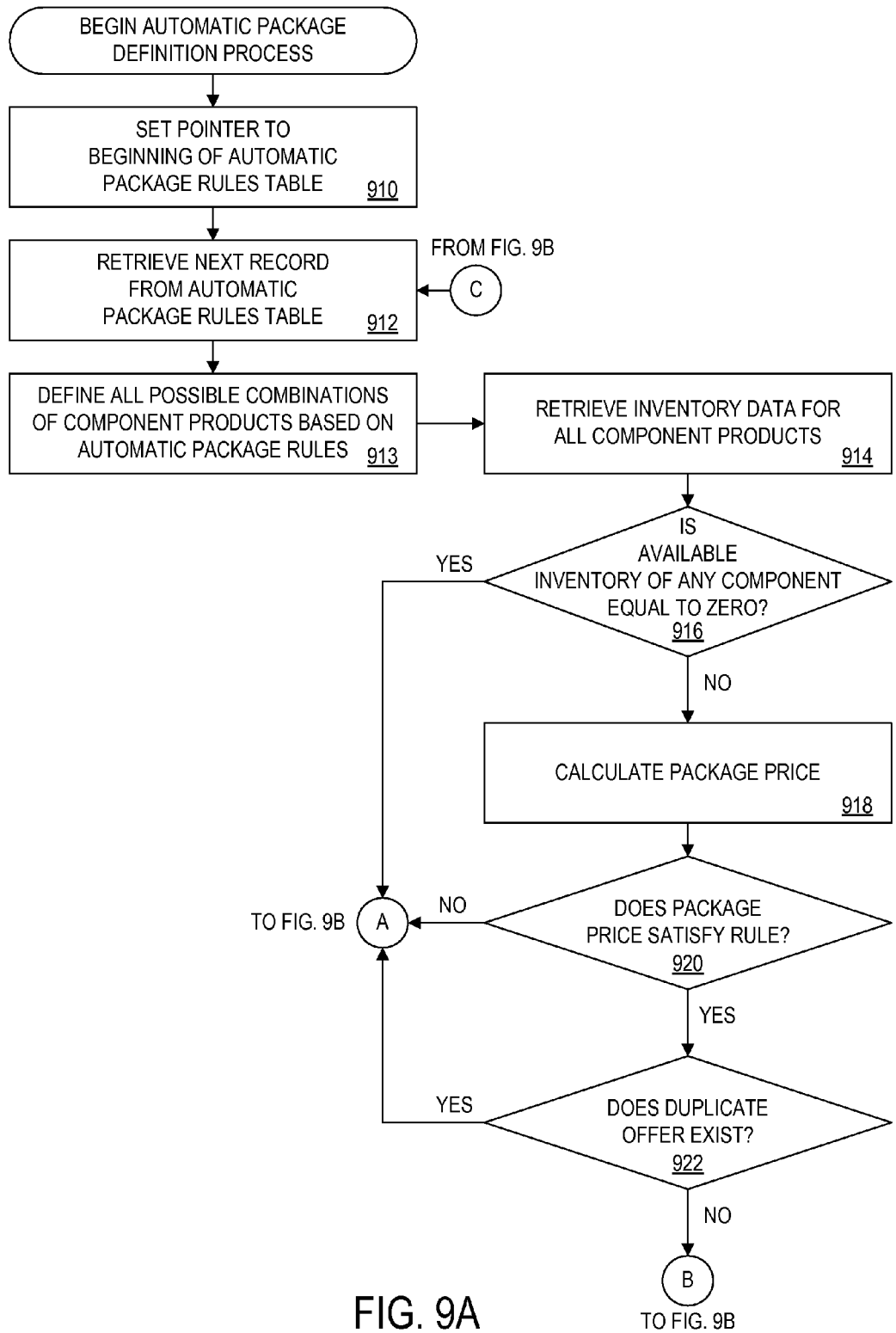
FIGS. 9A and 9B are flow charts illustrating the computer-implemented processes steps for automatically defining package offers according to predetermined rules.
Figure 9B:
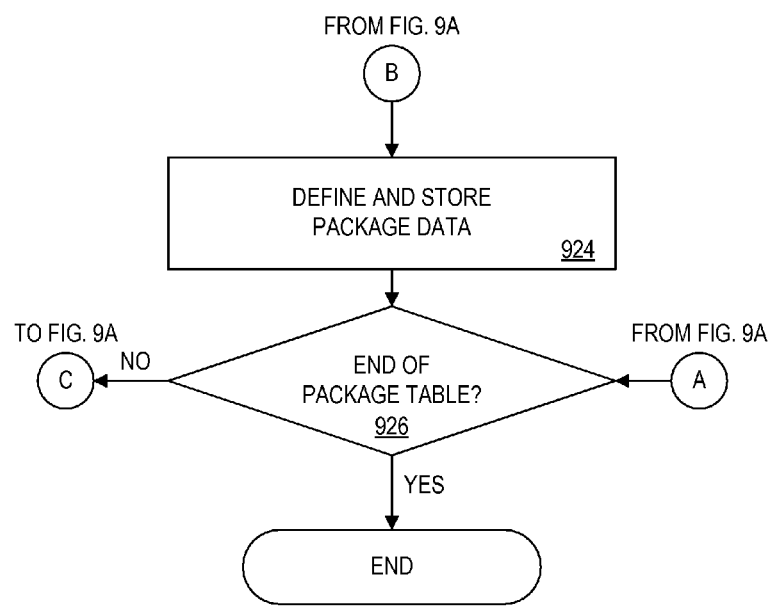

Referring now to FIG. 9A-9D, exemplary process steps are illustrated for automatically defining and maintaining package offers according to rules data stored in automatic package rules table 600. FIGS. 9A and 9B represent an automatic package definition process that is preferably executed periodically. This process automatically defines package offers, and may be performed once upon restocking, at other predetermined times or events, periodically or intermittently, such as after a sale or any time inventory data such as component price or available inventory has been updated. Although conventional vending machines maintain static inventory data during periods of zero sales, vending machines employing dynamic revenue management algorithms may experience changing inventory data resulting from, for example, expiring products or changing demand.

At step 910, a pointer is set to the beginning of automatic package rules table 600. The first record of the table is retrieved at step 912. At step 913, CPU 124 defines all possible combinations of component products based on the retrieved automatic package rules. Steps 914-924 are performed for every combination of component products defined at step 913.

Inventory data for all component products identified by the retrieved automatic package rule record are retrieved at step 914. If the available inventory of any component of a potential package is equal to zero, the package is unavailable, and decision step 916 directs process flow to step 926. Otherwise the package price is calculated at step 918.

At step 920, CPU 126 is directed to determine whether the calculated package price satisfies the relevant rule. If the package price does not satisfy the relevant rule, process flow is directed to step 926. Otherwise CPU 126 determines whether a duplicate package offer exists for the relevant rule. If a duplicate package offer exists, decision step 922 directs CPU 126 to process step 924, and the package offer data is defined and stored. At step 926, CPU 126 determines whether the end of the automatic package rules table is reached. If the end of table 600 has not been reached, the process continues with step 912.

Figure 9C:
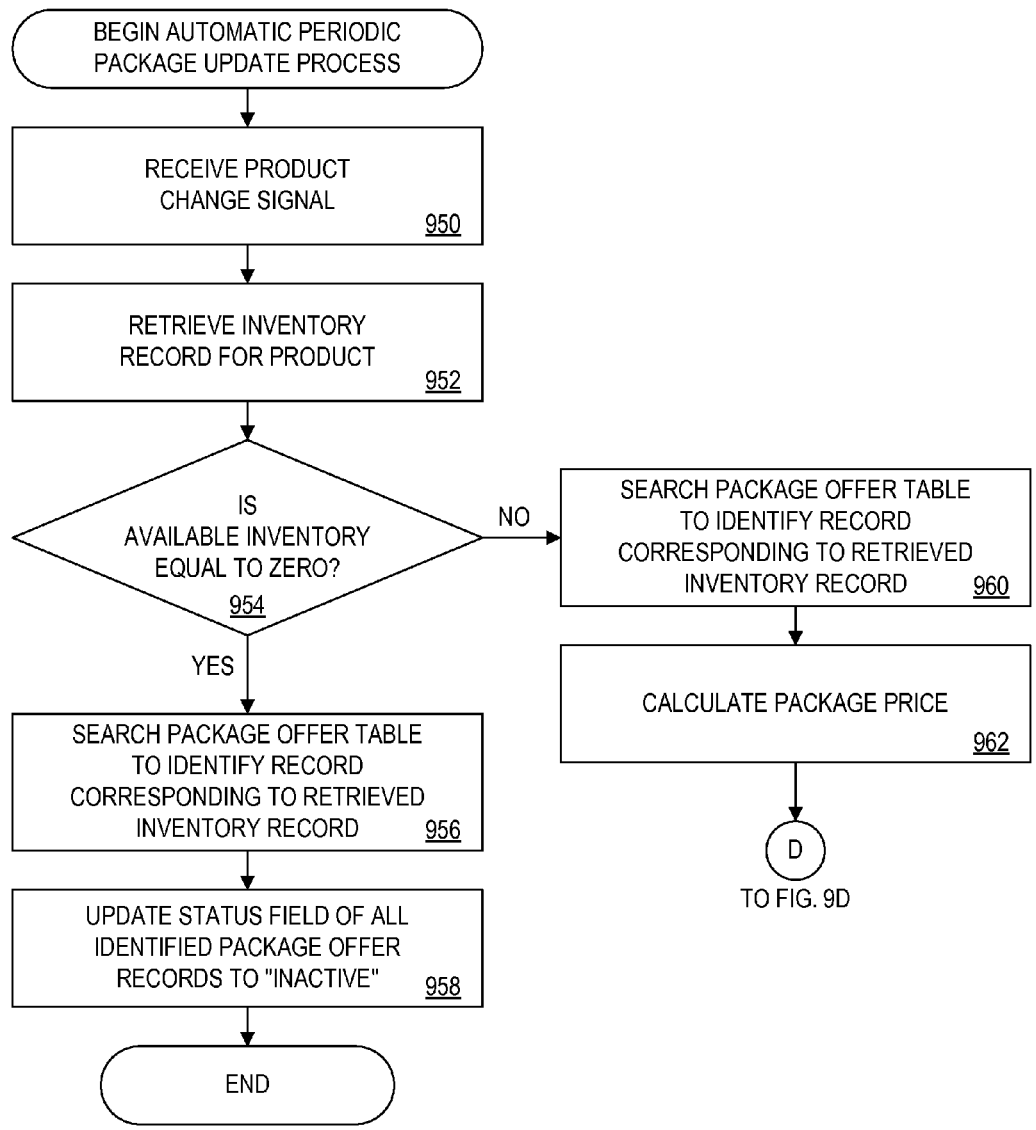
FIGS. 9C and 9D are flow charts illustrating the computer-implemented processes steps for automatically maintaining package offers according to predetermined rules.
Figure 9D:
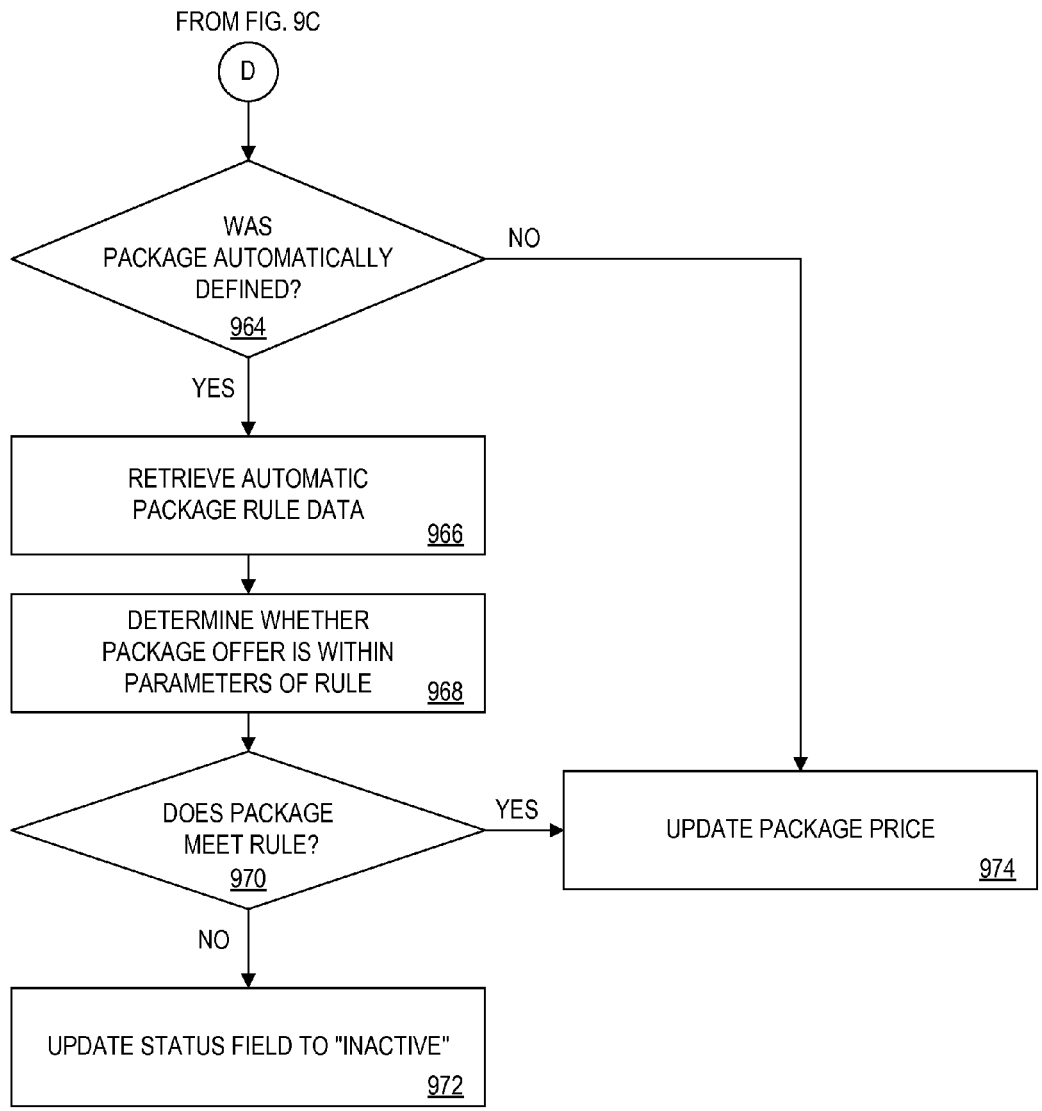

Referring now to FIGS. 9C and 9D, there is illustrated an automatic periodic package update process. This process automatically updates package offers based on changing inventory data. Changes to inventory data which may trigger the execution of the illustrated process include a change in component price and a change in available inventory.

At step 950, CPU 126 receives a signal representing a change in inventory data for an identified product. CPU 126 retrieves the inventory record for the identified product at step 952. At decision step 954, CPU 126 determines whether the available inventory for the identified product is equal to zero, and directs process flow to step 956 or 960 for a zero and non-zero determination, respectively. At step 956, CPU 126 searches package offer table 500 and identifies all records corresponding to the inventory record retrieved at step 952. The status field of every package offer records identified at step 952 is updated to "INACTIVE" at step 958.

If process flow is directed to step 960, the available inventory field of the inventory record retrieved at step 952 is greater than zero. Step 960 directs CPU 126 to search package offer table 500 to identify all records corresponding to the retrieved inventory record. For every identified package, the package price is calculated at step 962. Field 522 of every package record is examined to determine whether the package was automatically defined. If a package was not automatically defined, decision step 964 directs process flow to step 974, and CPU 126 updates the package price.

For an automatically defined package offer, CPU 126 retrieves the corresponding automatic package rule data at step 966. At step 968, CPU 126 determines whether the package offer is within the parameters of the corresponding automatic package rule. If the package definition meets the parameters of the automatic rule, decision block 970 directs CPU 126 to update the package price. Otherwise, the status field of the package offer record is set to "INACTIVE," as shown by step 972, whereby communication of the package offer via display 124 is terminated.

In addition to operator defined package offers and package offers automatically defined based on stored rules, package offers may be defined by a customer of vending machine 100.

Figure 10:
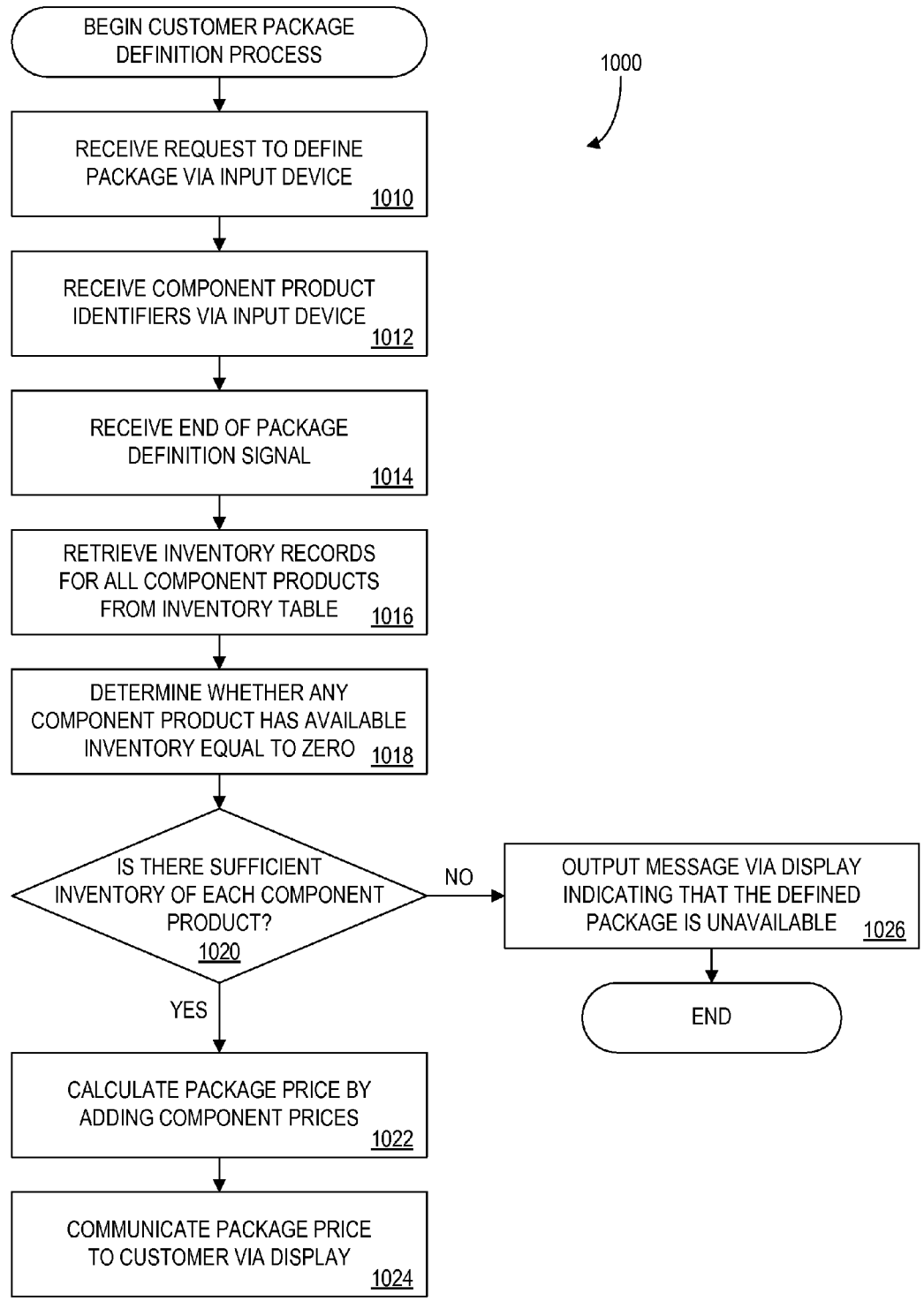
FIG. 10 is a flow chart illustrating the computer implemented process steps for enabling a customer to define a package.

Referring now to FIG. 10, the process steps of an exemplary customer package definition process are illustrated. At step 1010, CPU 126 receives a customer request via input device 110 to define a package. Alternatively, the customer request may be received from a customer's computer (e.g., through a Web browser communicating with a remote server, which in turn communicates with the vending machine). CPU 126 receives from the customer the component product identifiers via input device 110 at step 1012. At step 1014, CPU 126 receives a signal indicating the completion of the package definition.

At step 1016, CPU 126 retrieves from inventory table 400 the inventory record corresponding to each of the received component product identifiers. Step 1018 then directs CPU 126 to determine whether any component product has an available inventory equal to zero. If there is sufficient inventory of each component product, process flow passes through decision step 1020 to step 1022. Otherwise, CPU 126 is directed to output a message via display 124 indicating that the requested package is not available, as illustrated by step 1026.

If all component products of the defined package are available, CPU calculates the package price at step 1022. The package price is calculated by adding the component prices of each component product. The package price is communicated to the customer via display 122 at step 1024.

Figure 11:
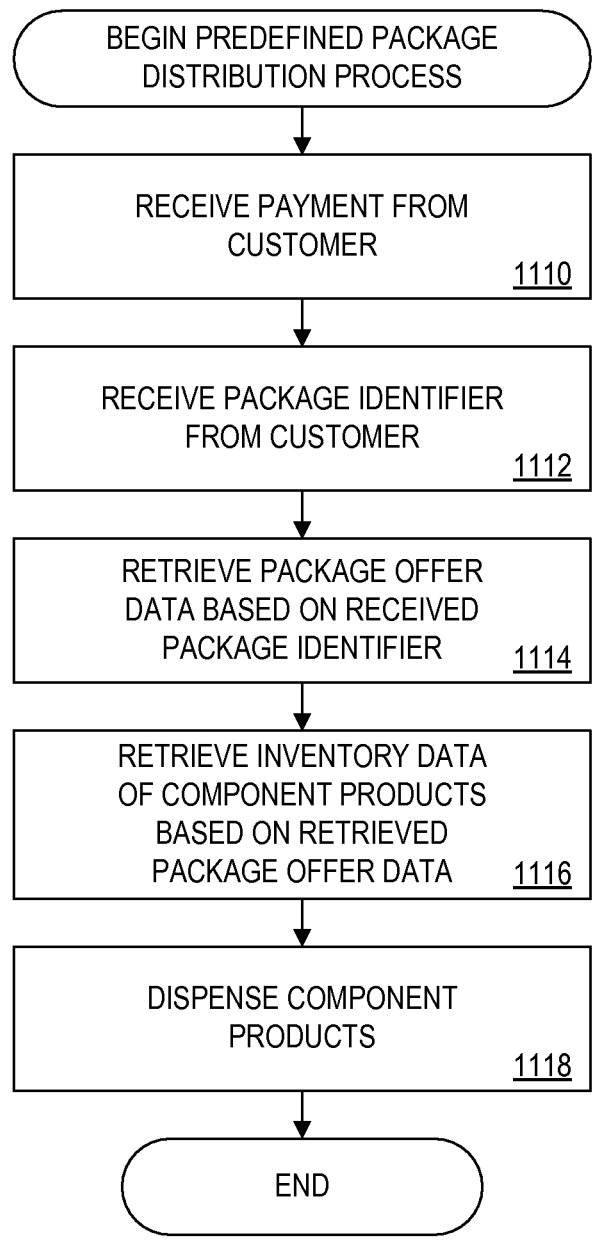
FIG. 11 is a flow chart illustrating the computer-implemented process steps used to distribute the components of a pre-defined package.
Figure 12:
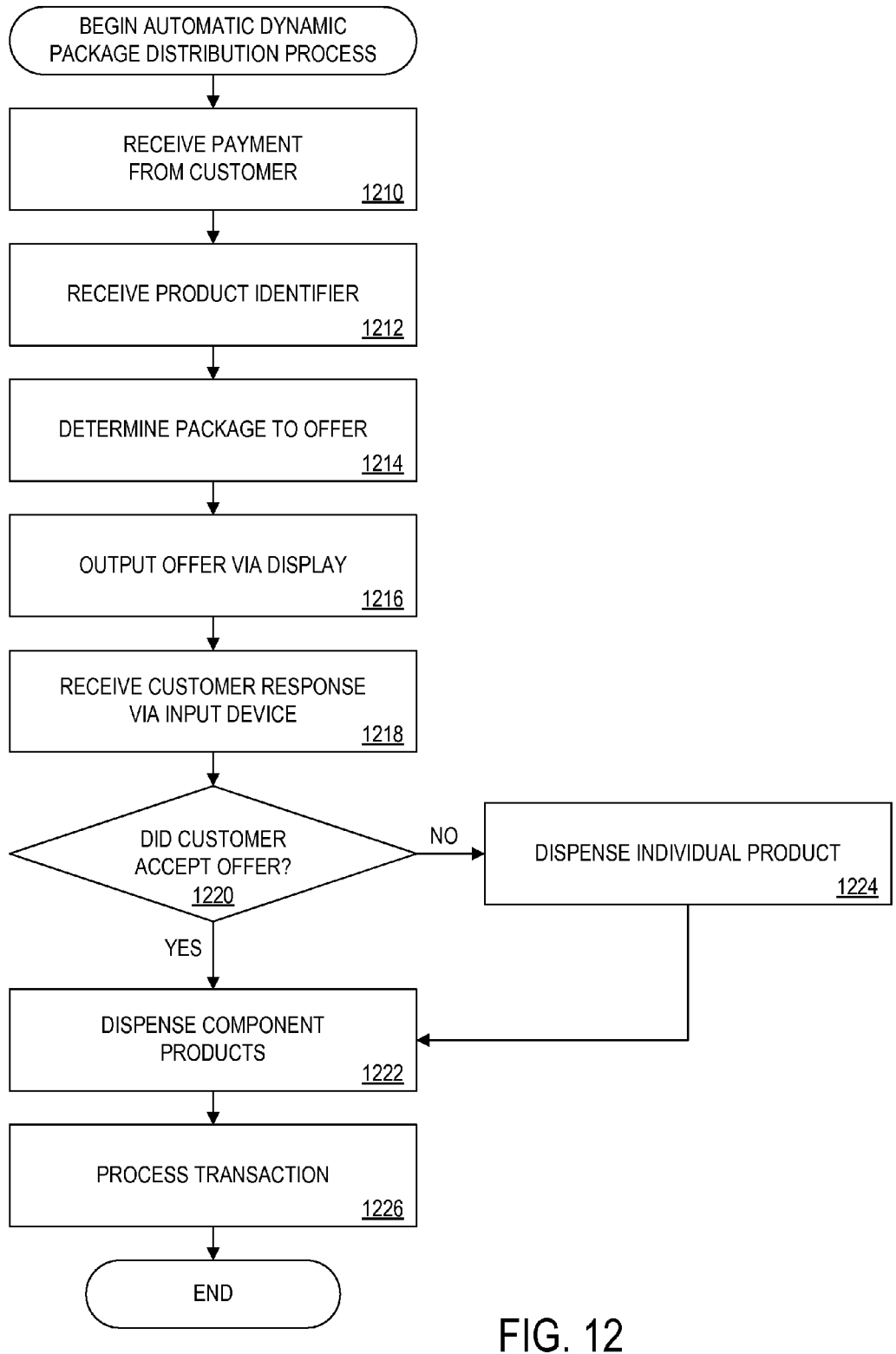
FIG. 12 is a flow chart illustrating the computer-implemented process steps used to distribute the components of an upsell package.
Figure 13:
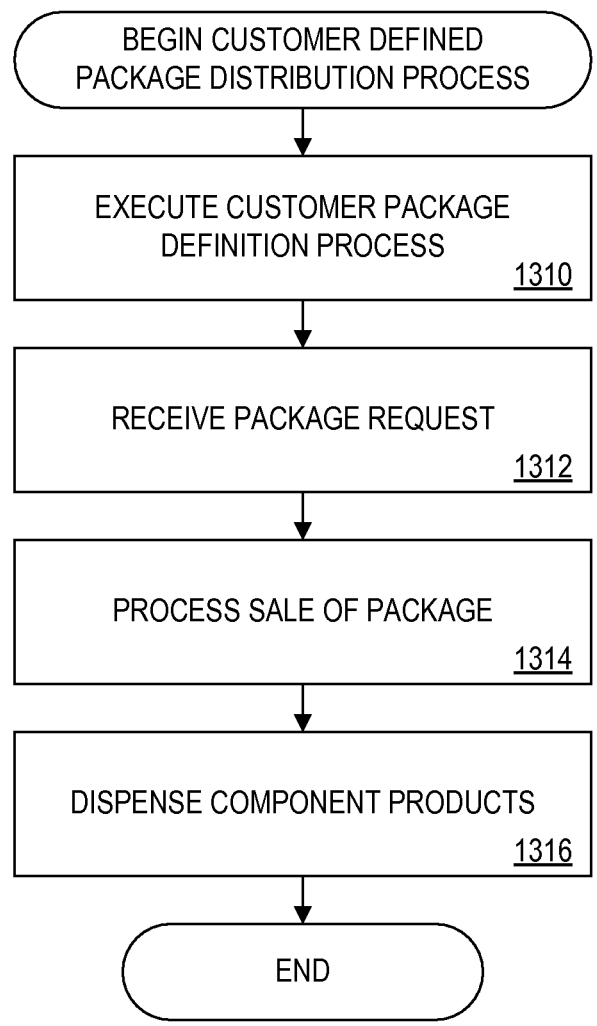
FIG. 13 is a flow chart illustrating the computer-implemented process steps used to distribute the components of a customer-defined package.

FIGS. 11-13 illustrate three alternative processes directed toward distributing component products of a package. FIGS. 11-13 illustrate distribution of a predefined package, distribution of a suggestive sale and distribution of a customer defined package, respectively.

Referring now to FIG. 11, there is depicted a flow chart illustrating the steps of an exemplary process for distributing a predefined package. At step 1110, CPU 126 receives a signal indicating that payment has been received from a customer. Payment may be received via coin acceptor 112, bill validator 114, or magnetic stripe reader 115. Payment may also be rendered remotely from the vending machine. For example, a customer may render payment online (e.g., via a computer and a web browser communicating with a remote server, which in turn communicates with the vending machine) using a credit card.

CPU 126 then receives a package identifier from the customer via input device 110. The received package identifier is associated with one of the predefined packages stored in package offer table 600. As previously indicated, the predefined package offer data represented by the records of table 600 may be automatically defined based on control logic and/or rules stored in storage device 134 or defined by a vending machine operator. One of ordinary skill will appreciate that the received package identifier may be validated in a number of well known ways.

At step 1114, CPU 126 uses the received package identifier as an index to retrieve package offer data, specifically a record from package offer table 600. CPU 126 then retrieves a record from inventory table 400 for each component product identified in the retrieved package offer record, as shown by step 1116. At step 1118, CPU 126 causes vending machine 100 to dispense the identified component products. Of course, control logic for performing the appropriate accounting and sales management functions, such as verifying that sufficient payment has been received, determining change and adjusting inventory data, may be included in the distribution process.

Referring now to FIG. 12, there is depicted a flow chart illustrating the steps of an exemplary process for distributing "upsell" packages that are marketed based on a customer's initial product selection. Such a process may be performed by a vending machine, by a server in communication with a vending machine, or a combination thereof. However, for simplicity the process is described as being performed by CPU 126. Packages may be predefined or dynamically defined at the time of sale based on a first product selection and an amount of payment deposited.

At step 1210, CPU 126 receives a signal indicating that payment has been received from a customer. At step 1212, CPU 126 receives a product identifier via input device 110.

At step 1214, CPU 126 is directed to determine a package to offer the customer. The determination of the package includes identifying the component products of the package and determining the package price. The determined package offer may be considered an "upsell"—an offer to sell both the product corresponding to the received product identifier and a second complementary product at a package price. This can be advantageous where, e.g., the customer was unlikely to have purchased the second product.

The step of determining a package to offer the customer may be accomplished in various ways. For example, step 1214 may be performed according to control logic that directs CPU 126 to select a package from among the predefined packages represented by the records of package offer table 500. Alternatively, step 1214 may be performed according to control logic that directs CPU 126 to define a package at the time of sale based on the rules represented by the stored records of automatic package rules table 600. Such control logic would direct CPU 126 to use the inventory data corresponding to the received first product identifier, the amount of payment received, the rules data of table 600 and the inventory data of table 400 to derive one or more acceptable second products to offer to a customer.

The control logic of step 1214 may limit the type of package that is offered to the customer. For example, in the broadest embodiment, the package determined at step 1214 may be any package that includes the identified product. In such an alternate embodiment, the customer may be required to deposit more money or may receive change after purchasing the package.

In one embodiment, the package determined at step 1214 may be an upsell package offer for a rounded price, such as $1.00, thereby designed not only to eliminate the need for receiving additional payment but also to eliminate the need for dispensing change. Such an upsell package includes the product identified by the received product identifier and at least one complementary product at a package price equal to the amount deposited at step 1210. CPU 126 may be directed to base the determination of the package on the payment received from the customer at step 1210 or on a rounded amount equal to the change due according to the product identified at step 1212.

In yet another alternative embodiment, step 1214 may include control logic for providing a customer with a "mystery package." Such alternative control logic would instruct CPU 126 to determine a set of second product identifiers representing products that are complementary to the first product, and offer the customer the option to purchase a second product without providing an exact description of the second product. If the customer accepts the offer, the customer discovers the selection of the second product after the first and second products are dispensed at step 1222. This alternative control logic could be employed by a vending machine operator to increase sales of low-demand or expiring products.

At step 1216, CPU 126 outputs a message extending the offer via display 124, and CPU 126 receives input from the customer via input device 110 at step 1218. The received input indicates whether the customer accepts or declines the offer. If the customer declines the offer, decision step 1220 directs CPU 126 to dispense the first product and process the transaction, as shown by steps 1224 and 1226. If the customer accepts the offer, CPU 126 dispenses the component products and processes the transaction as shown by steps 1222 and 1226.

Referring now to FIG. 13, there is depicted a flow chart illustrating the steps of an exemplary process for distributing the components of a customer-assembled package. Such a process may be performed by a vending machine, by a server in communication with a vending machine, or a combination thereof. However, for simplicity the process is described as being performed by CPU 126. In one embodiment, the customer defined package distribution process includes customer package definition process 1000.

At step 1310, CPU 126 receives a signal via input device 110 representing a request to purchase the defined package. If the request is received other than via the vending machine, the customer may be provided with a code (e.g., a unique randomly generated seven digit number) to identify the customer during redemption. CPU 126 processes the sale of the package at step 1312, including requiring additional payment and calculating and dispensing change to the customer. At step 1314, CPU 126 causes the component products to be dispensed, possibly after the customer identifies himself to the vending machine by, e.g., entering his code via a numeric keypad of the vending machine.

In addition to the stand-alone embodiments previously described, a variety of network embodiments may be employed. In one such embodiment, vending machine 100 may be connected to a vending server (not shown) and may preferably transmit digitally encoded data and other information between the server and/or other vending machines. The communication links between vending machine 100 and vending server preferably comprise a cable, fiber or wireless link on which electronic signals can propagate. For example, vending machine 100 may be connected via an Internet connection using a public switched telephone network (PSTN), such as those provided by a local or regional telephone operating company. Alternatively, each node may be connected by dedicated data lines, cellular, Personal Communication Systems ("PCS"), microwave or satellite networks.

In this configuration, the previously described functionality provided by processing module 144 (i.e. package definition) can be remotely performed by the vending server. Of course, conventional cryptographic techniques may be employed to ensure the authenticity of remote data received by the vending server or any connected vending machine. The vending server can also facilitate delivery of component products from among several networked vending machines allowing a customer to request a package from vending machine 100 and receive products from several networked vending machines.

As described above, various embodiments of the invention a separate device may be in communication with a vending machine, wherein the separate device is operable to instruct the vending machine that appropriate payment has been received and/or that a particular product should be dispensed by the vending machine.

In instructing the vending machine to dispense a package comprising a plurality of products, the separate device may receive input from customers regarding packages and/or output offers to customers regarding packages. Accordingly, in one embodiment the separate device may generally be programmed to perform some or all of the following steps:

Display an offer to a customer for a package having a package price (e.g., via a touch screen).

Receive from the customer a response to the offer (e.g., via a touch screen).

Display to the customer an instruction to select from the vending machine each of the products included in the package in a particular order.

As the customer selects each product, instruct the vending machine that payment for that products has been received. Particularly in an embodiment where the vending machine is not advanced, this may require instructing the vending machine that the full retail price for the product has been received (even though it typically is not if the package price is less than the sum of the product prices).

We claim:

1. A method, comprising:
    defining, by a vending machine, a plurality of packages, each package of the plurality of packages comprising two or more products from a population of products sold via the vending machine, wherein the defining comprises:
    identifying a record in a database that contains information defining a package rule;
    determining, based on the package rule and the population of products offered for sale via the vending machine, a plurality of possible combinations of products, each possible combination of products defining a possible package;
    retrieving inventory data for each of the products from the population of products offered for sale via the vending machine;
    determining, based on the inventory data that at least one possible package is available;
    defining package data for each of the at least one possible packages that are available;
    storing the package data for each of the at least one possible packages that are available in the database; and
    setting a status of each of the at least one possible packages that are available to an active status, wherein the plurality of packages comprises any of the at least one possible packages that have an active status; and
    outputting, by the vending machine and to a customer of the vending machine, an offer to purchase one of the plurality of packages for a package price.

2. The method of claim 1, further comprising:
    receiving, from the customer, a request to purchase the one of the plurality of packages;
    receiving an indication of a payment of the package price by the customer; and
dispensing the one of the plurality of packages of the two or more products.

3. The method of claim 2, wherein the dispensing comprises:
    dispensing a first one of the two or more products from the vending machine; and
    dispensing a second one of the two or more products from another vending machine.

4. The method of claim 1, wherein the package data comprises one or more of: (i) a package identifier; (ii) the package price; and (iii) a component identifier that identifies one of the two or more products.

5. The method of claim 1, wherein the defining of the plurality of packages further comprises:
    calculating, for each of the possible packages, a price; and
    determining if the prices are compliant with the package rule.

6. The method of claim 5, wherein the status of an available package is only set to the active status if the price for the package is determined to be compliant with the package rule.

7. The method of claim 1, wherein the defining of the plurality of packages further comprises:
determining if any of the possible packages are duplicates.

8. The method of claim 7, wherein the status of an available package is only set to the active status if the possible package is determined not to be a duplicate.

9. The method of claim 1, wherein the defining of the plurality of packages is triggered automatically by a change in inventory of at least one of the population of products sold via the vending machine.

10. The method of claim 1, wherein the defining of the plurality of packages is triggered automatically upon an elapse of a predetermined amount of time.

11. An apparatus, comprising:
a processor; and
a memory storing instructions that when executed by the processor cause the processor to perform the steps of:
defining, by a vending machine, a plurality of packages, each package of the plurality of packages comprising two or more products from a population of products sold via the vending machine, wherein the defining comprises:
identifying a record in a database that contains information defining a package rule;
determining, based on the package rule and the population of products offered for sale via the vending machine, a plurality of possible combinations of products, each possible combination of products defining a possible package;
retrieving inventory data for each of the products from the population of products offered for sale via the vending machine;
determining, based on the inventory data that at least one possible package is available;
defining package data for each of the at least one possible packages that are available;
storing the package data for each of the at least one possible packages that are available in the database; and
setting a status of each of the at least one possible packages that are available to an active status, wherein the plurality of packages comprises any of the at least one possible packages that have an active status; and
outputting, by the vending machine and to a customer of the vending machine, an offer to purchase one of the plurality of packages for a package price.

12. A non-transitory computer readable medium storing instructions that when executed by a computer processor causes the processor to perform the steps of:
defining, by a vending machine, a plurality of packages, each package of the plurality of packages comprising two or more products from a population of products sold via the vending machine, wherein the defining comprises:
identifying a record in a database that contains information defining a package rule;
determining, based on the package rule and the population of products offered for sale via the vending machine, a plurality of possible combinations of products, each possible combination of products defining a possible package;
retrieving inventory data for each of the products from the population of products offered for sale via the vending machine;
determining, based on the inventory data that at least one possible package is available;
defining package data for each of the at least one possible packages that are available;
storing the package data for each of the at least one possible packages that are available in the database; and
setting a status of each of the at least one possible packages that are available to an active status, wherein the plurality of packages comprises any of the at least one possible packages that have an active status; and
outputting, by the vending machine and to a customer of the vending machine, an offer to purchase one of the plurality of packages for a package price.

* * * * *